(12) United States Patent
Masuda et al.

(10) Patent No.: US 7,136,824 B2
(45) Date of Patent: Nov. 14, 2006

(54) ELEMENT ORGANIZATION SUPPORT APPARATUS, ELEMENT ORGANIZATION SUPPORT METHOD AND STORAGE MEDIUM

(75) Inventors: Yoshihiro Masuda, Nakai-machi (JP); Toshiya Yamada, Nakai-machi (JP); Yuichi Ueno, Nakai-machi (JP); Katsunori Horii, Nakai-machi (JP)

(73) Assignee: Fuji Xerox Co., LTD, Tokyo (JP)

( * ) Notice: Subject to any disclaimer, the term of this patent is extended or adjusted under 35 U.S.C. 154(b) by 969 days.

(21) Appl. No.: 09/760,730

(22) Filed: Jan. 17, 2001

(65) Prior Publication Data

US 2001/0008997 A1 Jul. 19, 2001

(30) Foreign Application Priority Data

Jan. 19, 2000 (JP) ............................ 2000-010915

(51) Int. Cl.
*G06Q 99/00* (2006.01)
(52) U.S. Cl. ........................................................ 705/8
(58) Field of Classification Search ................ 705/8
See application file for complete search history.

(56) References Cited

U.S. PATENT DOCUMENTS

| | | | |
|---|---|---|---|
| 5,745,687 A | 4/1998 | Randell | |
| 5,768,506 A | 6/1998 | Randell | |
| 5,774,661 A | 6/1998 | Chatterjee et al. | |
| 5,819,270 A | 10/1998 | Malone et al. | |
| 5,832,455 A | 11/1998 | Hayashi et al. | |
| 6,064,381 A * | 5/2000 | Harel | 715/705 |
| 6,466,935 B1 * | 10/2002 | Stuart | 707/10 |
| 6,757,692 B1 * | 6/2004 | Davis et al. | 707/104.1 |
| 6,820,118 B1 * | 11/2004 | Leymann et al. | 709/223 |
| 6,853,974 B1 * | 2/2005 | Akifuji et al. | 705/9 |
| 2003/0154115 A1 * | 8/2003 | Lahey et al. | 705/8 |

FOREIGN PATENT DOCUMENTS

| | | |
|---|---|---|
| JP | A 8-101817 | 4/1996 |
| JP | A 9-62733 | 3/1997 |
| JP | A 10-326315 | 12/1998 |
| JP | 2002-99564 A * | 4/2002 |

OTHER PUBLICATIONS

T. W. Malone et al., "Tools for inventing organizations: Toward a handbook of organization processes", Proceedings of the 2nd IEEE Workshop on Enabling Technologies Infrastructure for Collaborative Enterprises, pp. 20-22, 1993.
T. Kreifelts et al., "Sharing To-Do Lists with a Distributed Task Manager", Proceedings of ECSCW '93, pp. 31-46, 1993.
G. Riempp, "Wide Area Workflow Management-Creating Partnerships for the 21st Century" Springer-Verlag, 1998.

* cited by examiner

*Primary Examiner*—Susanna M. Diaz
(74) *Attorney, Agent, or Firm*—Oliff & Berridge, PLC

(57) ABSTRACT

The present invention provides an element organization support apparatus, an element organization support method and a storage medium for facilitating the addition, deletion or modification of executive elements. This is an element organization support apparatus in which, upon receiving the input of a project to be accomplished including plural tasks from an input unit, a modeling processor searches an activity database for activity data with processible tasks as keys, selects and displays on a display unit real activity candidates, and reads out of a hard disk and displays information on past evaluation of the selected combination of real activities.

13 Claims, 21 Drawing Sheets

FIG.5

```
MEDIA
    DOCUMENT
        PAPER DOCUMENT
            DRAWING
            INVOICE
            DEED
            BOOK
                BOOK
                MAGAZINE
        ELECTRONIC DOCUMENT
            EDITOR FILE
                Word FILE
            PRINTED IMAGE FILE
                PDF FILE
                PS FILE
            INTERNET DOCUMENT
                HTML FILE
                XML FILE
    ELECTRIC WAVE
        TELEPHONE
            WIRELESS TELEPHONE
            WIRED TELEPHONE
                ⋮
```

FIG.11

| COMPOUND PATTERN | INTERPRETATION |
|---|---|
| CREATE(out:X) + MODIFY(in : X, out : Y) | CREATE(out:Y) |
| MODIFY(in : X, out : Y) + MODIFY(in : Y, out : Z) | MODIFY(in : X, out : Z) |
| COMBINE(in : *,out:X) + MODIFY(in : X, out : Y) | COMBINE(in : *, out : Y) |
| MODIFY(in : X, out : Y) + SEPARATE(in : Y, out : *) | SEPARATE(in : X, out : *) |

| ORGANIZATION | CUSTOMER'S NAME | EVALUATION SCORE |
|---|---|---|
| {A, B, C} | a a a a | 4 |
| {D, E, F} | b b b b | 3 |
| {A, B, E} | c c c c | 5 |
| ⋮ | ⋮ | ⋮ |

FIG.23

(define PLANNING <YAMADA>
 (succeeding DISPLAY DESIGN <TANAKA>, CONTENTS PREPARATION <KONDO> ...)
)

(define COVER DESIGN <TANAKA>
 (preceding PLANNING <YAMADA>)
 (succeeding LAYOUT <SUZUKI> ...)
)

(define PROOFREADING <KATO> (preceding LAYOUT <SUZUKI>) (succeeding PRINTING <SATO>))
        _____/ _____/ _____/
               A                      C                            D
_____/
                    B

ELEMENT ORGANIZATION SUPPORT APPARATUS, ELEMENT ORGANIZATION SUPPORT METHOD AND STORAGE MEDIUM

BACKGROUND OF THE INVENTION

1. Field of the Invention

The present invention relates to an element organization support apparatus, an element organization support method and a storage medium for supporting the formation of a team to organize human or physical elements or a combination of both to accomplish a specific project, and more particularly to improving the efficiency of addition or coordination of elements or of restructuring of the organization.

2. Description of the Related Art

Along with the expanding use of the Internet in recent years, the environment of accomplishing a project is changing significantly, including the emergence of so-called SOHO (small office home office) workers each of whom connects his or her company and home via a network. In corporate business activities as well, so-called outsourcing is drawing attention which addresses short-term peaks in workload or to secure personnel with unique skills by relying on the supply of human resources from a temporary help business or entrusting a whole series of tasks to another company.

On the other hand, there are apparatuses for supporting the generation of a workflow by organizing human and physical resources and their combinations (hereinafter to be collectively referred as "activities") on the basis of input/output relationships, i.e. what is done by each activity (process) according to the result of what activity (input from the preceding activity) and to what other activity it hands over its result (output to the succeeding activity).

A specific example of such an apparatus, as illustrated in FIG. 22, is provided with a database 1, an input unit 2, a searching unit 3, a display unit 4 and a control unit 5. The database 1 stores the identifier (name of the like) of each activity, input, process and output, correlated to one another, as a set of rules. This set of rules, as illustrated in FIG. 23, is stored with information representing the process, information on the preceding activity (preceding) and information on the succeeding activity (succeeding) correlated to one another with respect to each identifier.

The input unit 2 is an input device, such as a keyboard or a mouse, which conveys what the user's manipulation is intended for to the control unit 5. The searching unit 3, at an instruction from the control unit 5, searches the database 1 for activities with the respective preceding activities and following activities as keys, and supplies the result of the search to the control unit 5. Also, this searching unit 3 receives an input of a starting condition from the control unit 5, and searches for process information with the starting condition as the key, and supplies the result of the search to the control unit 5. The display unit 4 is an output device such as a display or a printer, which displays or prints at an instruction from the control unit 5. The control unit 5 performs processing to add activities to or delete some of the activities stored in the database 1 and processing to select activities to take charge of a series of tasks, out of the activities stored in the database 1, and to output them.

More specifically, the processing by this control unit 5 to add activities includes, in response to the entry from the input unit 2 the identifier (A) and the process (B) of each activity, the preceding activity (C) and the following activity (D) as shown in FIG. 24, sets and stores the activity into the database 1, addition of each activity to be added to the preceding activity (C) as the latter's following activity, and the addition of that activity to be added to the following activity (D) as its preceding activity. The processing to delete activities is to delete each activity whose identifier has been entered from the input unit 2 and to modify the activity preceding and the activity following that activity to be deleted.

Further the processing by this control unit 5 to select and output activities includes, in response to the entry from the input unit 2 the starting condition and the ending condition, causing the searching unit 3 to search for a first activity meeting the starting condition and causing further the searching unit 3 to search for a second activity which has the retrieved first activity as its preceding activity. In this manner, the control unit 5 causes the searching unit 3 to search for plural activities successively, and completes the processing when the ending condition is met. More specifically, for a project of "producing a book", if "planning" is the starting condition and "printing" is the ending condition, the control unit 5 causes the searching unit 3 to search for an activity having this "planning" as the process. Then the control unit 5, having received the input of the result of search, causes the searching unit 3 to search for an activity following the retrieved activity ("cover design" and "contents preparation in the example of FIG. 23), and repeats this procedure until an activity whose process is "printing" is hit.

A workflow support system for achieving flexible workflow managing by applying, in generating a workflow, workflow rules under decentralized management for workflows difficult to generate while performing back tracking is disclosed in Japanese Published Unexamined Patent Application No. Hei 8-101817 entitled "Workflow Support System".

An apparatus which, when the starting and ending positions of a partial flow prescribing the sequence of execution are designated, additionally stores new tasks generated by modifying the task preceding the starting position and the task following the ending position of that partial flow into an execution conditions storage section is disclosed in the Japanese Published Unexamined Patent Application No. Hei 9-62733 entitled "Flow Adding Apparatus".

However, this conventional apparatus for supporting workflow generation, when a new activity is to be registered, finds it difficult to keep that activity consistent in context. That is to say, this conventional workflow generation support apparatus, in which activities are managed on the basis of a so-called input process output (IPO) model, addition, deletion or modification of any activity should be accomplished while maintaining consistency with other activities, decentralized management of activity databases would require reflection of alterations in any database in all other databases, which means serious difficulty in management. There is a further problem that the load of processing to maintain consistency with activities becomes heavier with an increase the number of activities managed by the databases.

Furthermore, the conventional workflow generation support apparatus based on the IPO model, in which links among activities are derived from a preset context, involves another problem that the generation of a work process for selecting a series of activities for accomplishing tasks and carrying out a project lacks flexibility. The presetting of the context causes still another problem that the detection of a new value chain, such as detecting a new linkage, is made difficult.

SUMMARY OF THE INVENTION

The present invention, attempted in view of these circumstances, provides an element organization support apparatus, an element organization support method and a storage medium to facilitate the management of elements which execute individual tasks and to make possible decentralized management of these elements in a network environment.

The invention also provides an element organization support apparatus capable of generating a work process flexibly.

The invention further provides an element organization support apparatus capable of facilitating the detection of a new value chain.

According to one aspect of the present invention, there is provided an element organization support apparatus for selecting, for a project including plural tasks, executive elements for each task and supporting the organization of the plural executive elements. The apparatus has an executive element management section for classifying each executive element into processible tasks and managing them, and a selecting section for selecting out of the executive element management section a candidate executive element that can process each of the tasks.

This way of managing executive elements classified into processible tasks and selecting candidate executive elements with processible tasks as keys makes it possible, when any new executive element is to be added, to select candidate executive elements for accomplishing a project irrespective of the contextual relationships of tasks and to add the new executive element easily without having to accomplish processing to maintain the context.

Also, since candidate executive elements are selected with processible tasks as keys irrespective of the context, there is no need to cause input/output relationships among executive elements ensuing from addition, deletion or modification of executive elements in any database to be reflected in other databases even though executive elements are managed in a decentralized way in plural databases, resulting in efficient decentralized management.

According to another aspect of the invention, the element organization support apparatus has a task description storage section for storing plural task descriptions defined in accordance with rules of hierarchization and plural tasks each matching one of the task descriptions, a modeling section for generating a hierarchical model by hierarchically combining the plural descriptions according to the project to be accomplished; and a selecting section for selecting candidate executive elements for accomplishing the project on the basis of the hierarchical model.

By generating on the basis of these task descriptions a hierarchical model in which the project to be accomplished is hierarchically divided irrespective of the presence or absence of any executive element for processing each task and selecting candidate executive elements for processing tasks on the basis of this hierarchical model, if these rules of hierarchization are taken into consideration when adding any new executive element, the need to consider relationships with other executive elements is eliminated, and the addition of any new executive element can be accomplished easily.

It is preferable for this element organization support apparatus described above to include a section for combining task descriptions in advance in accordance with combination rules, and a section for storing the combined task descriptions into the task description storage section as a new task description. In this manner the detection of a new value chain can be facilitated by providing an executive element to execute a new processible task by combining existing task descriptions.

According to another aspect of the invention, there is provided an element organization support apparatus for selecting, for use in the accomplishment of a job asked by a customer, an executive element for each of the plural tasks involved in the job, and supporting the organization of the plural executive elements to accomplish the job. The apparatus includes an executive element management section for classifying each executive element into processible tasks and managing them, and a selecting section for selecting from the executive element management section a candidate executive element that can process each of the tasks.

A service providing method according to another aspect of the invention includes a step of classifying plural executive elements for executing tasks constituting various services in advance into processible tasks and managing them, in which the executive elements include at least one of human and physical elements, a step of receiving a request for organizing, for the accomplishment of a specific service asked by a customer, executive elements for processing the specific service, a step of analyzing, as instructed by the customer, tasks required for the specific service, and a step of selecting from the executive elements classified and managed, on the basis of the result of the analysis, the executive elements to execute the tasks.

Thus it is made possible to organize executive elements in a manner matching a job asked by a customer or a specific service, and to easily achieve element organization suitable for outsourcing.

According to another aspect of the invention, there is provided an element organization support method for selecting, for a project made up of plural tasks, executive elements for each task and supporting the organization of the plural executive elements. The method includes a step of classifying the executive elements into processible tasks in advance and managing them, and a step of searching the executive elements classified and managed for the executive element to execute each task, and selecting it.

This management of executive elements classified into processible tasks and selection of candidate executive elements with processible tasks as keys makes it possible, when any new executive element is to be added, to select candidate executive elements for accomplishing a project irrespective of the contextual relationships of tasks and to add the new executive element easily without having to accomplish processing to maintain the context.

This also eliminates, even if executive elements are under decentralized management in plural databases, the need to cause the addition, deletion or modification of any executive element in each database to be reflected in other databases, resulting in efficient decentralized management.

Incidentally, each step of the methods according to the service providing method and element organization support method above should preferably be carried out with a computer.

According to another aspect of the invention, there is provided a computer-readable storage medium storing thereon a program for selecting, for a project made up of plural tasks, executive elements for each task and thereby supporting the organization of the plural executive elements. The program includes a first module for classifying the executive elements into processible tasks in advance and managing them, and a second module for searching the executive elements classified and managed for the executive element to execute each task required for a given service, and selecting it.

This management of executive elements classified into processible tasks and selection of candidate executive elements with processible tasks as keys makes it possible, when any new executive element is to be added, to select candidate executive elements for accomplishing a project irrespective of the contextual relationships of tasks and to add the new executive element easily without having to accomplish processing to maintain the context.

This also eliminates, even if executive elements are under decentralized management in plural databases, the need to cause the addition, deletion or modification of any executive element in each database to be reflected in other databases, resulting in efficient decentralized management.

The module for managing classified executive elements may as well achieve classified management of executive elements by requesting a library, an operating system or a server to manage them as classified. The module for searching for and selecting executive elements may also do so by requesting a library, an operating system or a server to search for and select them.

An element organization support system according to another aspect of the invention has a task description server for accumulating plural task descriptions defined in accordance with rules of hierarchization and plural tasks each matching one of the task descriptions; and a selection server for acquiring plural task descriptions from the task description server according to a project to be accomplished, generating a hierarchical model by combining the descriptions hierarchically, and selecting candidate executive elements for implementing the project on the basis of the hierarchical model.

An element organization support system according to another aspect of the invention has a database server for classifying data pieces regarding plural executive elements for executing individual tasks constituting various services into processible tasks, and managing them, in which the data pieces regarding executive elements include at least one of human and physical elements, a reception server for receiving a request for the preparation of organization of executive elements for processing a specific service asked by a customer, and an analysis server for analyzing tasks required for the specific service as instructed by the customer, and selecting from the database server, on the basis of the result of the analysis, data pieces regarding executive elements for executing individual tasks.

BRIEF DESCRIPTION OF THE DRAWINGS

These and other features and advantages of the present invention will become more apparent from the following detailed description when taken in conjunction with the accompanying drawings, wherein:

FIG. 5 illustrates an example of data structure of the thesaurus of operation subject names in the thesaurus database 42;

FIG. 11 illustrates one example of rules of activity compounding;

FIG. 23 illustrates a conventional set of rules on the combination of activities; and FIG. 24 illustrates one example of conventional rules on the combination of activities.

DETAILED DESCRIPTION OF THE PREFERRED EMBODIMENTS

Figure 1:
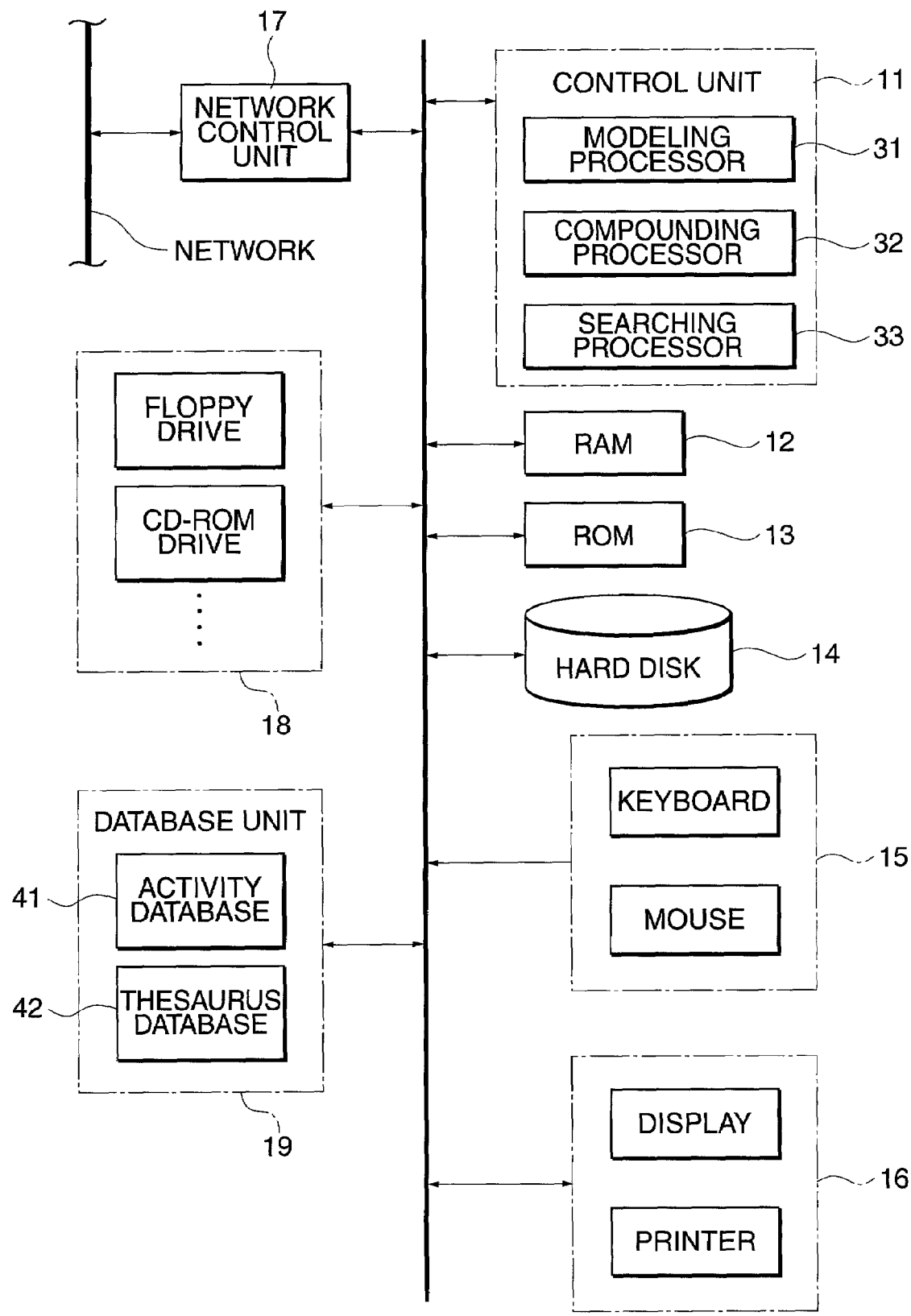
FIG. 1 is a structural block diagram of an element organization support apparatus in one embodiment of the invention.

Preferred embodiments of the present invention will be described below with reference to drawings. An element organization support apparatus in a first embodiment of the invention, as illustrated in FIG. 1, is provided with a control unit 11, a random access memory (RAM) 12, a read only memory (ROM) 13, a hard disk 14, an input unit 15, a display unit 16, a network control unit 17, an external memory device 18, and a database unit 19, which are connected to one another. The control unit 11 includes a modeling processor 31, a compounding processor 32 and a searching processor 33. The database unit 19 includes an activity database 41 and a thesaurus database 42.

The modeling processor 31 of the control unit 11 carries out processing to generate a work process meeting given conditions. Processing by this modeling processor 31 will be described in detail elsewhere in this specification. The compounding processor 32 of the control unit 11 combines in advance task descriptions according to the invention in accordance with rules of compounding. It references the activity database 41, and carries out processing to generate a new activity by compounding existing activities. The operation of this compounding processor 32 will also be described in detail later on. The searching processor 33 of the control unit 11 is actuated by the input of a searching key, and searches for an activity matching the searching key entered from the activity database 41 of the database unit 19. This control unit 11 also executes, immediately after the power supply is turned on, actuation processing stored in the ROM 13 to read basic software (an operating system such as Windows (trademark)) from the hard disk 14 into the RAM 12 and to execute it.

The RAM 12 operates as a work memory in various manners of processing performed by the control unit 11. The ROM 13 stores an initialization program and the like, including an initial program loader (IPL) to be executed by the control unit 11 immediately after power supply to the element organization support apparatus in this embodiment is turned on. The hard disk 14 stores at least basic software to be processed by the control unit 11 and a processing program for materializing an element organization apparatus in this embodiment. The input unit 15, which is an input device such as a keyboard or a mouse, transmits the user's manipulation to the control unit 11. The display unit 16, which is an output device such as a display or a printer, displays or prints the selected activity or the like in accordance with an instruction entered from the control unit 11.

The network control unit 17, in accordance with an instruction entered from the control unit 11, transmits an instruction to request searching or the like via a network, using an TCP/IP protocol or the like, receives a request for searching or the result of searching via the network, and supplies it to the control unit 11.

The external memory device 18 accesses a floppy disk drive or a computer-readable storage medium such as CD-ROM or a DVD-ROM, reads out a program stored on the storage medium and supplies it to the control unit 11, or copies it onto the hard disk 14 to install it. This external memory device 18, in accordance with an instruction entered from the control unit 11, stores various programs and parameters onto this storage medium.

Figure 2:
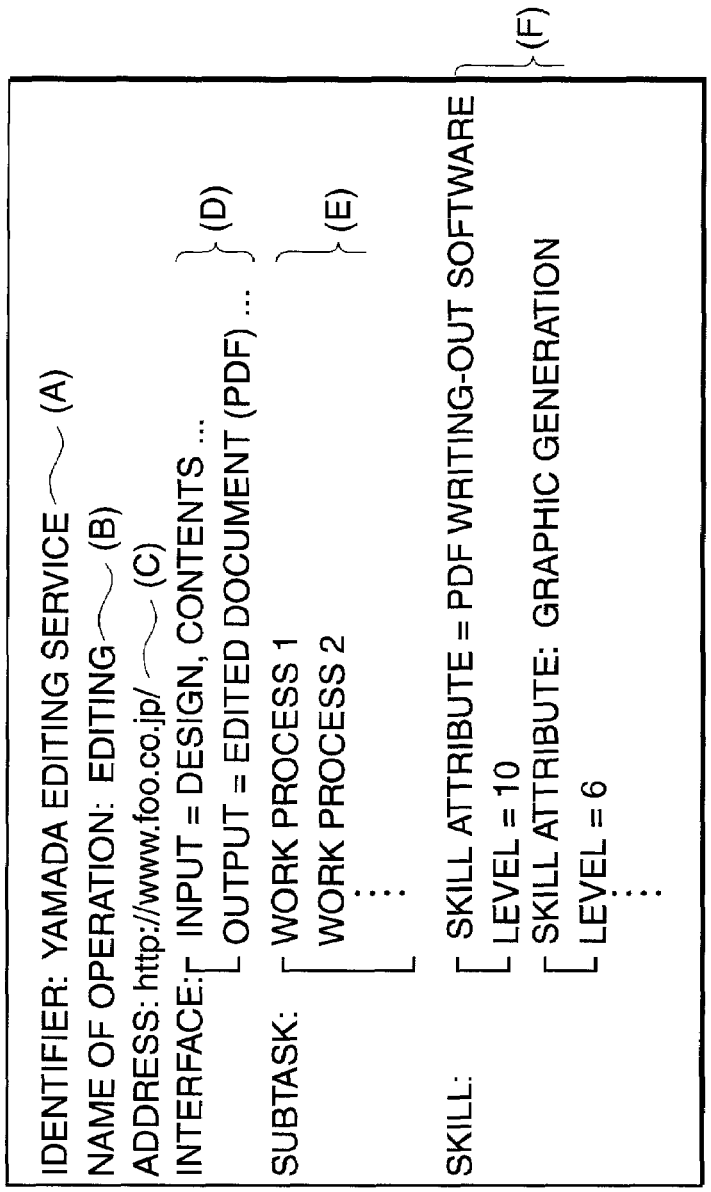
FIG. 2 illustrates an example of data structure of an activity.

The activity database 41 of the database unit 19 stores activities as executive elements or task description in the manner illustrated in FIG. 2. In this FIG. 2, an identifier (A) for identifying the service is, for instance, the name of this executive element. A name of operation (B) represents a processable task, and an address (C), the destination of liaison or access by this activity, such as URL. An interface (D) represents an input this activity needs (what is to be received from the preceding activity) and what this activity can supply (what can be handed over to the following activity). What is characteristic of this embodiment is that there need not be a real human or physical resource matching each activity, which instead may be an abstract activity. In this case, the blanks for the identifier (A) and the address (C) are left blank. In the following description a task relevant to a real human or physical resource will be referred to as a "real activity" and where there is no need to distinguish between a real activity and an abstract activity the pertinent activity will be referred to simply as an "activity". This abstract activity corresponds to a task description according to the invention, and the real activity, an executive element according to the invention.

Figure 3:
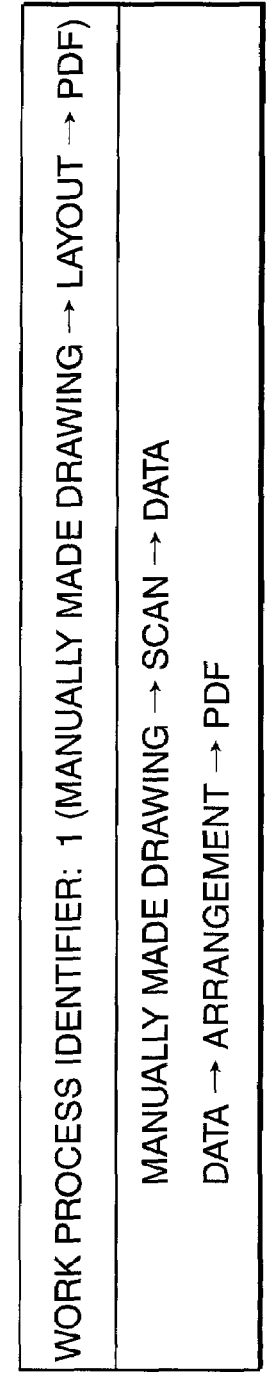
FIG. 3 illustrates an example of data structure of a subtask in activity data.

What is characteristic of this embodiment is that, where there is a subtask (E) pertaining to this activity, this subtask is stored relevantly to the activity. This subtask corresponds to the rules of hierarchization according to the invention and, more specifically, represents each of individual task segments into which a task to be processed by this activity is divided as illustrated in FIG. 3. In the example illustrated in FIG. 3, upon receipt of the input of a manually made drawing, a layout is set as the processable task to prepare a portable document format (PDF) file. Here is shown a layout task including a subtask to scan the manually made drawing into digital data and another subtask to arrange the result data to prepare a PDF file. These subtasks, as will be described in further detail below, is referenced and utilized by the modeling processor 31 particularly where the activity is an abstract activity.

What further is characteristic of this embodiment is that information (F) regarding skills that may be required by tasks processible by each activity is stored relevantly to each activity. This skill information includes a skill attribute representing a processible task and the processing capability (level) of this activity with respect to that skill.

Figure 4:
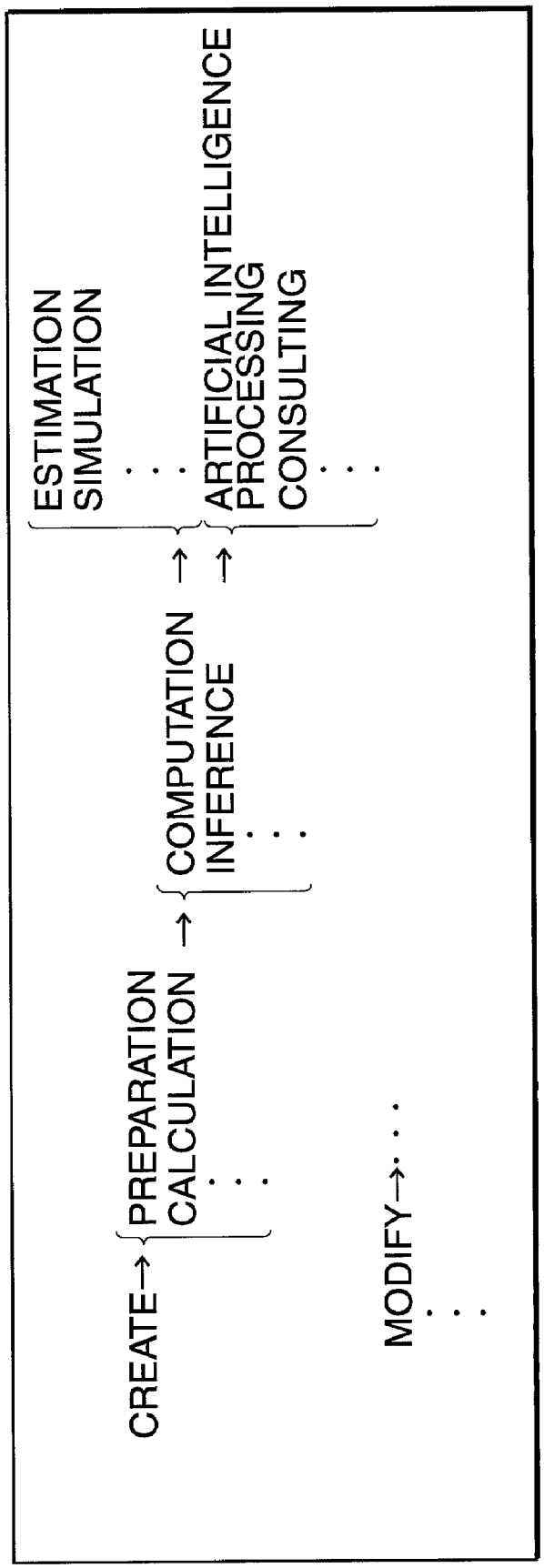
FIG. 4 illustrates an example of data structure of the thesaurus of operation names stored in a thesaurus database 42.

The thesaurus database 42 of the database unit 19 hierarchically stores concepts of operation names. More specifically, this thesaurus database 42 stores the hierarchical structure of concepts of operation names in the manner illustrated in FIG. 4. More specifically, this FIG. 4 shows that there is "computation" as a superior concept to, and "simulation" as a concept of the same level as, "estimation". This thesaurus database 42 is used by the searching processor 33 of the control unit 1 to be described in more detail afterwards.

This thesaurus database 42 also stores the hierarchical structure of concepts with respect to inputs and outputs (hereinafter these inputs and outputs will be collectively referred to as "operation subject names") designated by an interface representing the context of the activity. Thus the concept of this operation subject name, as illustrated in FIG. 5, including media as the highest level concept and document, electric wave and so forth as inferior concepts, and the document further includes paper document, electronic document and so on as still inferior concepts, is stored as hierarchically analyzed in this manner.

Here, the operation name representing a processible task should preferably be an expression in a unified manner for the convenience of subsequent searching. In this embodiment, a manner of expression proposed in T. W. Malone, J. Crowston, J. Lee and B. Pentland, Tools for inventing organizations: Toward a handbook of organization processes , Proceedings of the 2nd IEEE Workshop on Enabling Technologies Infrastructure for Collaborative Enterprises, pp. 20–22, 1993 (this reference will be hereinafter referred to as the "Process Handbook" and the manner of expression based thereon, as "handbook expression") as the unified manner of expression of operation names. In this handbook expression, the names of operation as processible task are basically classified into eight concepts including "create", "destroy", "modify", "combine", "separate", "preserve", "decide", and "manage". Detailed explanation of this classification is dispensed with here as its details can be found in the "Process Handbook" cited above. What is characteristic of this embodiment is that not only are operation names expressed in unified manner but also the interface representing the concept is placed under thesaurus management as stated above.

In the thesaurus database 42, the concepts of operation names are stored with these eight concepts in handbook expression as the highest level concepts: regarding "create" for instance, "event planning" and "web site creation" are stored as inferior concepts relevant to them. In the drawings, the operation of "magazine publishing" for example by "synthesizing" "articles and advertisements" to produce a "magazine" is represented by "{articles and advertisements}→combine→magazine" or generically by "input→operation→output".

Hereupon, processing by the modeling processor 31 of the control unit 11 will be described with reference to FIG. 6. The modeling processor 31, upon receiving the input of the process of the work which is to be the goal from the input unit 15, starts the processing illustrated in FIG. 6. The work which is to be the goal in this context corresponds to the ending condition, for instance the operation of the work, such as "publishing". In the following description, this initially given goal will be referred to as the "final goal". The modeling processor 31 first gives the searching processor 33 a request to search for an activity with the operation name of this goal as the key (S1) and, receiving the input of the result of searching, checks if there is any activity matching the request for searching (S2). If there is no activity matching the request for searching (if the reply is "No"), the modeling processor 31 ends the processing. Or if there is any activity or activities searched for at step S2 (if the reply is "Yes"), one of those activities selected (S3), and the selected activity is referenced to see whether or not it is a real activity relevant to a human or physical resource (S4). If the selected activity is a real activity (if the reply is "Yes"), the relevant human or physical resource can be presented as a candidate, and accordingly this selected activity is stored into the RAM 12 in preparation for presentation (S5).

Then the modeling processor 31 further checks whether or not there is any unselected activity (S6) and, if there is any (If the reply is "Yes"), returns to step S3 to select one of other activities to continue the processing. Or there is no unselected activity (If the reply is "No"), it ends the processing.

On the other hand if at step S4 there is neither human nor physical resource relevant to the selected activity and it is an abstract activity (if the reply is "No"), it is checked whether or not any subtask is made relevant to the activity (S9), and if none is (if the reply is "No"), and the processing moves on to step S6 (A). Or if at step S9 any subtask or subtasks are found relevant to the activity (if the reply is "Yes"), one of the relevant subtasks is selected (S10), and the processing shown in FIG. 6 is recursively executed with the selected subtask as the goal (S11). Therefore, processing by this modeling processor 31 is designed to be recursively processible. Upon completion of the processing at step S11, the modeling processor 31 further checks if there is any unselected subtask (S12), and if there is any unselected one (if the reply is "Yes"), it returns to step S10 to select another subtask to continue the processing. Or if at step S12 if finds no unselected subtask (if the reply is "No"), it moves ahead to step S6 (A).

Activities are stored in the same region on the RAM 12 at step S5 in every round of processing, including what is recursively executed. This results in storage in a prescribed region on the RAM 12 of candidates of activities to be presented.

If there is found at step S9 any activity irrelevant to any human or physical resource of any subtask (hereinafter to be referred to as a "fully abstract activity"), the processing is supposed to move on directly to step S6, but the processing may be stopped with an error message or first exceptional processing shown in FIG. 7 may as well be performed. The first exceptional processing shown in FIG. 7 is to cause activity searching to be accomplished with the name of operation, with respect to a fully abstract activity, expanded to superior concepts or concepts of the same level. Thus the modeling processor 31 acquires the operation name of the fully abstract activity (S21), requests the searching processor 33, with that operation name as a key, to search the operation names stored in the thesaurus database 42 as superior concepts or concepts of the same level (S22). Then it checks whether or not any of the operation names of the superior concepts or concepts of the same level matches the request for searching (S23) and, if none does (if the reply is "No"), gives an error message to the display unit 16 (S24) to stop the processing (S25). Or if at step S23 any of the operation names of the superior concepts or concepts of the same level is found matching what is searched for (if the reply is "Yes"), recursively executes the processing shown in FIG. 6 with the operation name matching the request for searching as the goal (S26) to end the processing. Since the first exceptional processing may be further executed then, this first exceptional processing is also generated to be recursively processible. If at this step S23 there are plural operation names matching the searching request in the thesaurus database 42, recursive execution of step S26 is performed with those of the same level concept first, in other words in a decreasing order of conceptual proximity.

Figure 6:
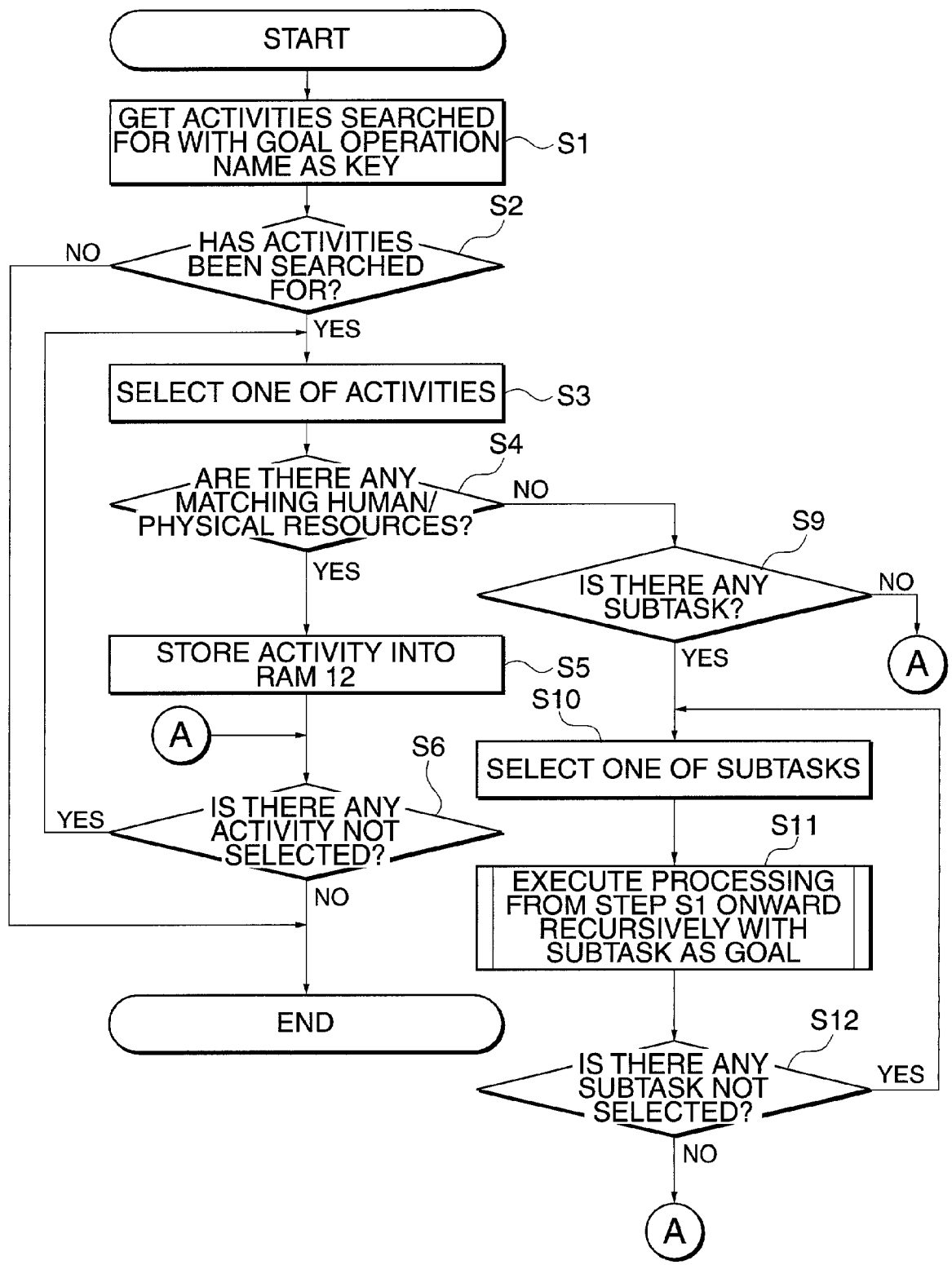
FIG. 6 is a flowchart of processing by a modeling processor 31.
Figure 7:
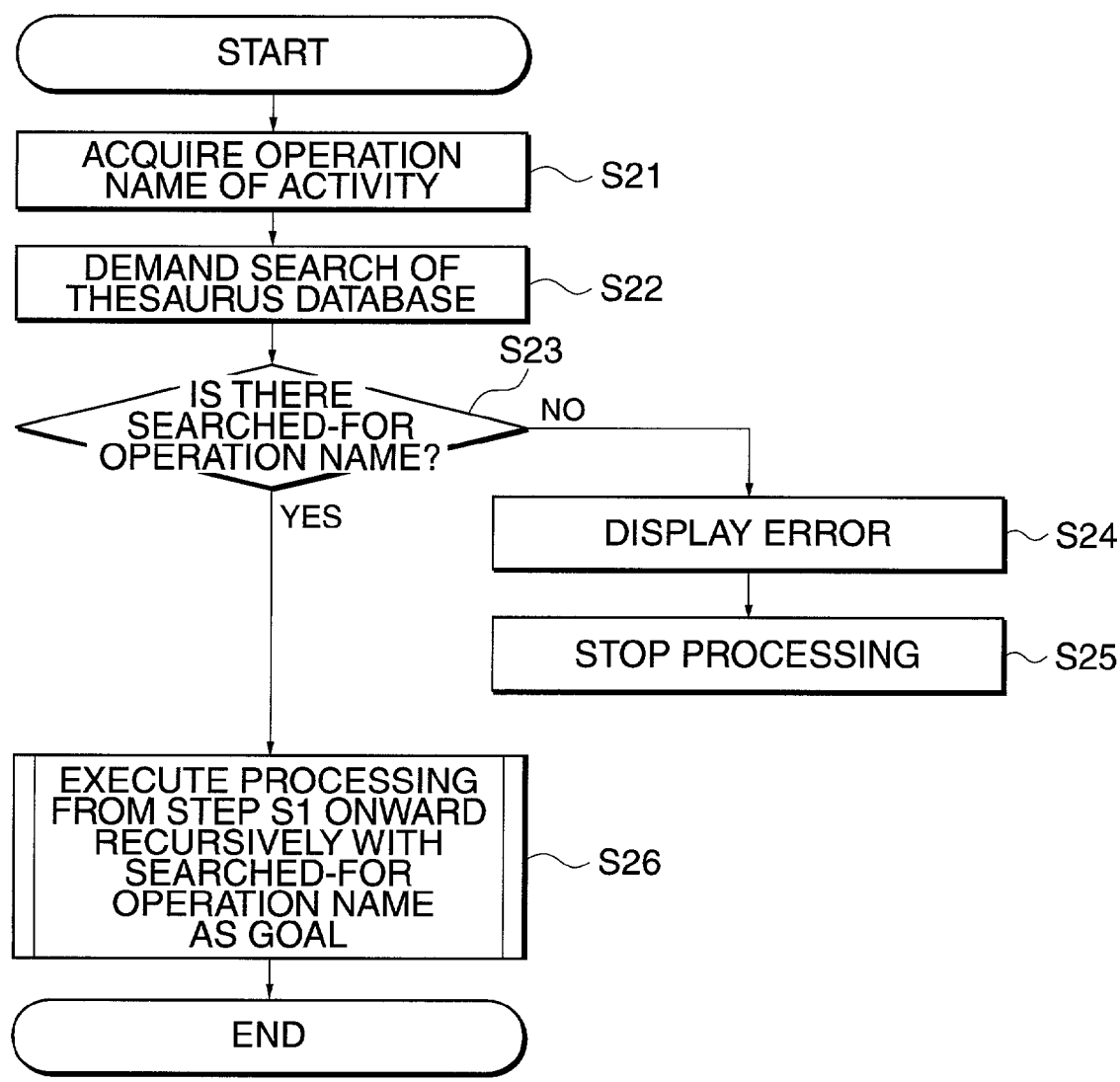
FIG. 7 is a flowchart of one example of exceptional processing by the modeling processor 31.

Or if in recursive execution from this first exceptional processing a real activity is found at step S4 shown in FIG. 6, the first exceptional processing may be interrupted at that point of time. In this case, a flag may be set in advance in a prescribed region of the RAM 12, stood upon storage of the real activity into the RAM 12, and is referenced by the first exceptional processing after the completion of the recursively executed processing and, if the flag is found standing, the processing may be ended at that point of time.

Figure 8:
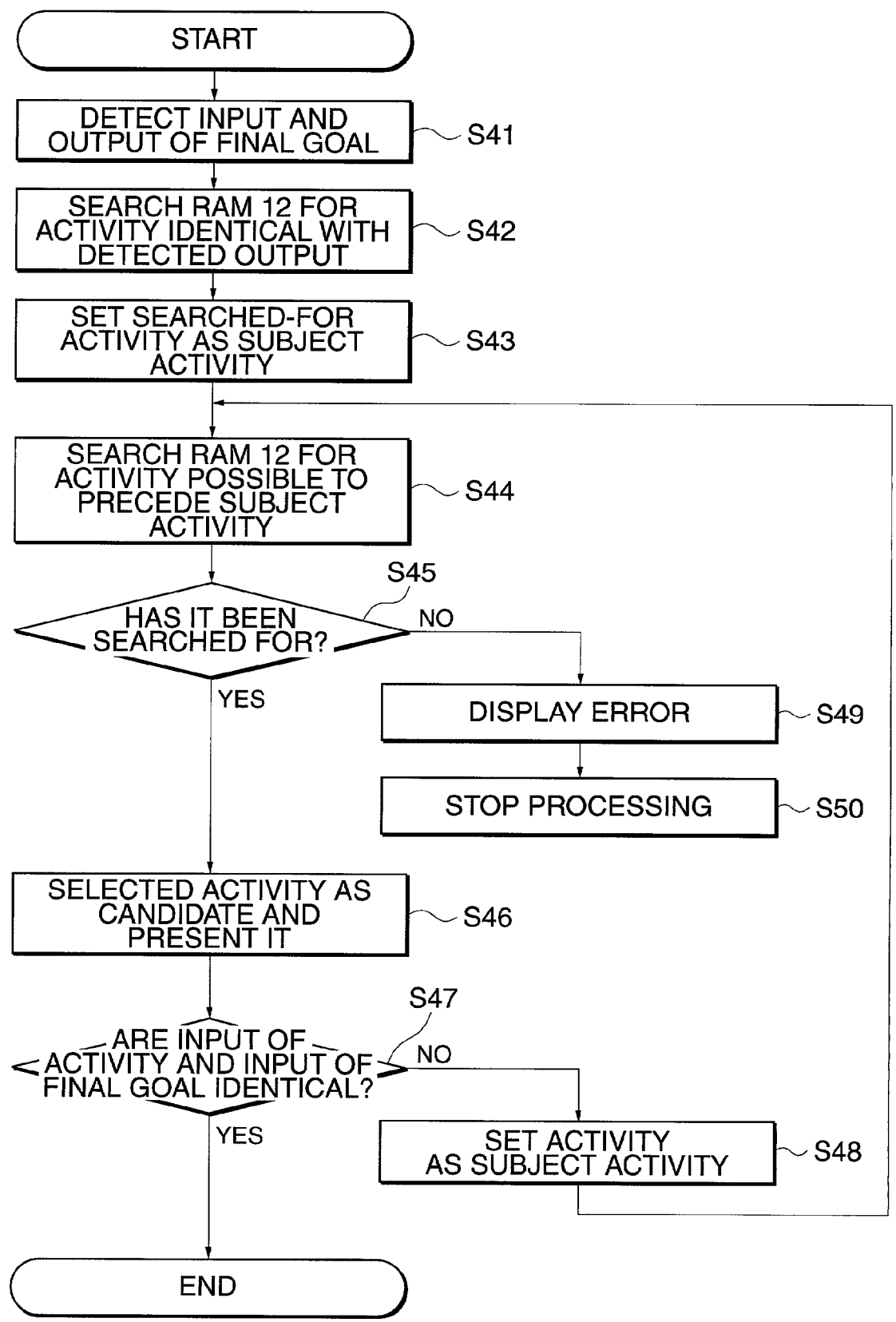
FIG. 8 is a flowchart of presentation processing by the modeling processor 31.

Upon completion of the whole processing including recursive executions, the modeling processor 31 starts presentation processing as illustrated in FIG. 8, and presents real activities stored in the RAM 12. More specifically, in this presentation processing, the modeling processor 31 references the initially designated final goal, and detects the input to and the output from the final goal (S41). Then, processing by the modeling processor 31 searches for any activity matching the output from this final goal out of the real activities stored in the RAM 12 (S42) and, setting this activity as the subject (S43), searches the activities stored in the RAM 12 for any activity that can precede this activity set as the subject (hereinafter to be referred to as the "subject activity") (S44). It is then checked by searching whether or not there is any precedable activity (S45) and, if there is (if the reply is "Yes"), the subject activity and the activity matching the request for searching are linked to each other. The activity matching the request for searching is selected as a candidate, and presented to the user by supplying it to the display unit 16 (S46). This link generation is accomplished by a known method, for instance by generating a chain of pointers to individual activities, the chain relating the pointers to one another.

The modeling processor 31 further checks whether or not the input to the activity matches the input to the final goal (S47). If at this step S47 the activity found matching the request for searching at step S44 is found matching the input to the final goal (if the reply is "Yes"), the processing is ended. Or if at step S47 no matching is found (if the reply is "No"), the processing is repeated from step S44 with that activity as the subject activity (S48). If at step S45 no precedable activity matching the request for searching is found (if the reply is "No"), the modeling processor 31 displays an error message (S49) to stop the processing (S50).

Here, the precedable activity at step S44 means the activity to output the subject of operation to be inputted to that subject activity. Thus at step S44, each activity is searched with the operation subject name that is to be the input to the subject activity as a key. Where, for instance, a "cover design" is the operation subject to be inputted to the subject activity, an activity to output a "cover design" can precede this subject activity, but an activity to output only "contents" cannot precede this subject activity.

Incidentally, although it is supposed to display an error message and to stop the processing if no precedable activity is found by searching, steps S49 and S50 may be replaced by the outputting to the searching processor 33 a request to search the hierarchical structure regarding the operation subject name in the thesaurus database for any concept superior to or of the same level as the operation subject which the subject activity demands to be inputted and, if there is such a concept superior to or of the same level to the operation subject, a second exceptional processing may be carried out to search for any activity that can precede the subject activity with the operation subject name as a key.

If at step S44 there are plural activities that can precede the subject activity, each activity is subjected to the processing described below.

To add, the activity searched for and selected by the first exceptional processing and the second exceptional processing is to make possible accomplishment of the project somehow by selecting a human or physical resource whose processible task is not exactly the required "estimation" but is "simulation" which is a concept of the same level or selecting not exactly "magazine" but is "book" which is a concept superior to "magazine", thereby presenting a human or physical resource having a similar skill to make up for the lack of the exactly required human or physical resource. Therefore, activities selected by the first and second exceptional processing may be unable to accomplish the respectively required tasks. Accordingly it is preferable, when these activities are presented at step S46, to present them in a way permitting their distinction from activities searched for and selected by usual processing. This way of distinction may be emphasizing by character qualification, such as underlining or the use of a bold type, or the use of a different color.

Figure 9:
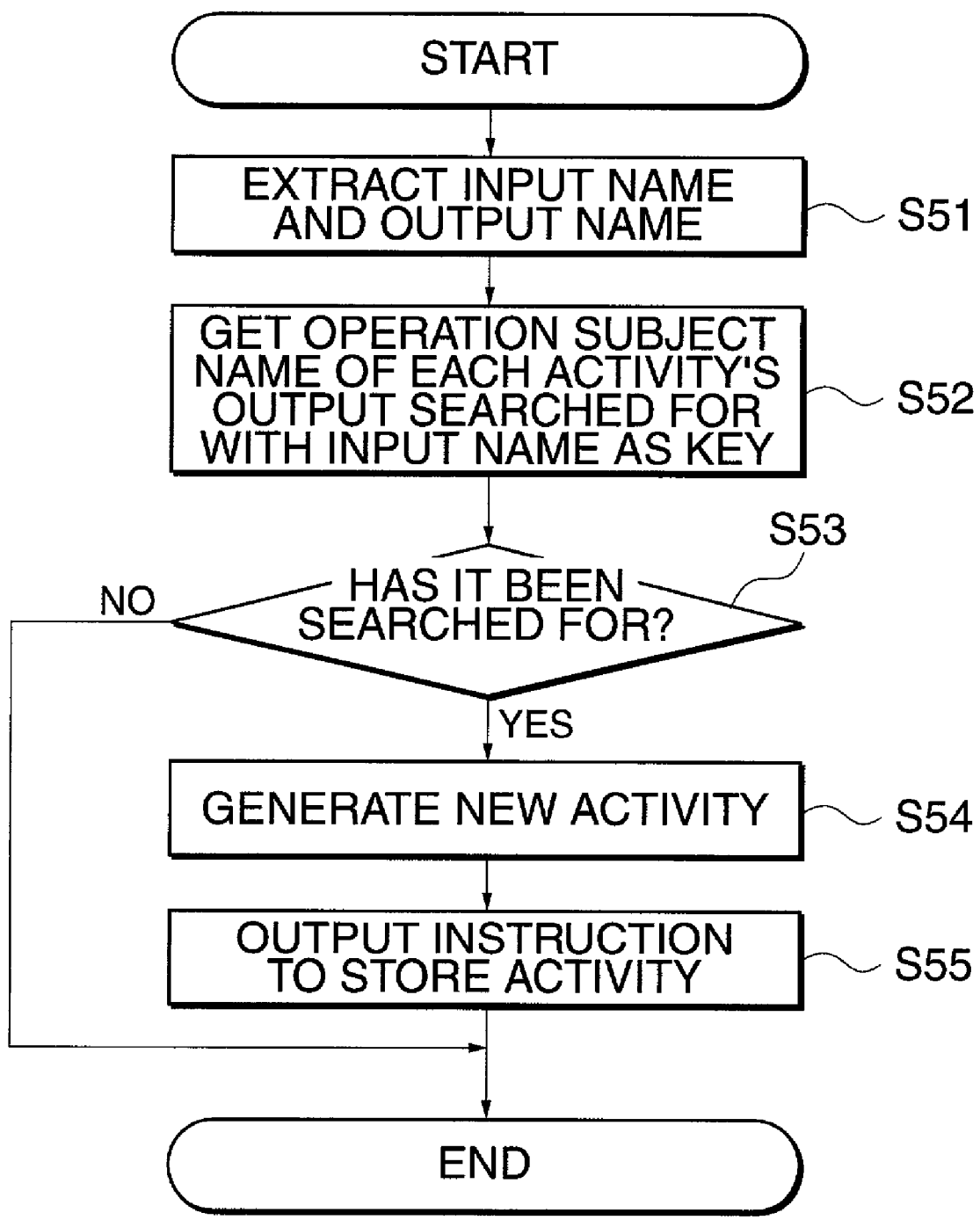
FIG. 9 is a flowchart of processing by a compounding processor 32.

Next will be described processing by the compounding processor 32. This processing by the compounding processor 32 is executed when, for instance, an instruction to store a new activity given to the activity database from the input unit 15 or the like. As illustrated in FIG. 9, first the operation subject names of the input to and the output (hereinafter the input and the output will be respectively referred to as the "input name" and the "output name") from an activity to be newly stored (hereinafter this activity will be referred to as the "new activity") (S51), and the searching processor 33 is caused to search the activity database 41 with the output operation subject name of each activity as the subject of searching and the input name as the key (S52). In response to the input of a reply from the searching processor 33, it is checked whether or not there is any activity matching the request for searching (S53). If there is an activity matching the request for searching (if the reply is "Yes"), the new activity and the activity matching the request for searching are combined by applying rules of activity compounding to be described later on to create a new activity (hereinafter to be referred to as the "compound activity") having these as subtasks (S54), and an instruction to store this compound activity is recursively given to the control unit 11 (S55) to end the processing. Therefore, the processing by this compounding processor 32 can be recursively accomplished. On the other hand, if at step S53 no activity is found by searching (if the reply is "No"), the processing is ended. Thus in this embodiment, as shown at step S55, the control unit 11 stores the compound activity into the activity database 41.

Figure 10:
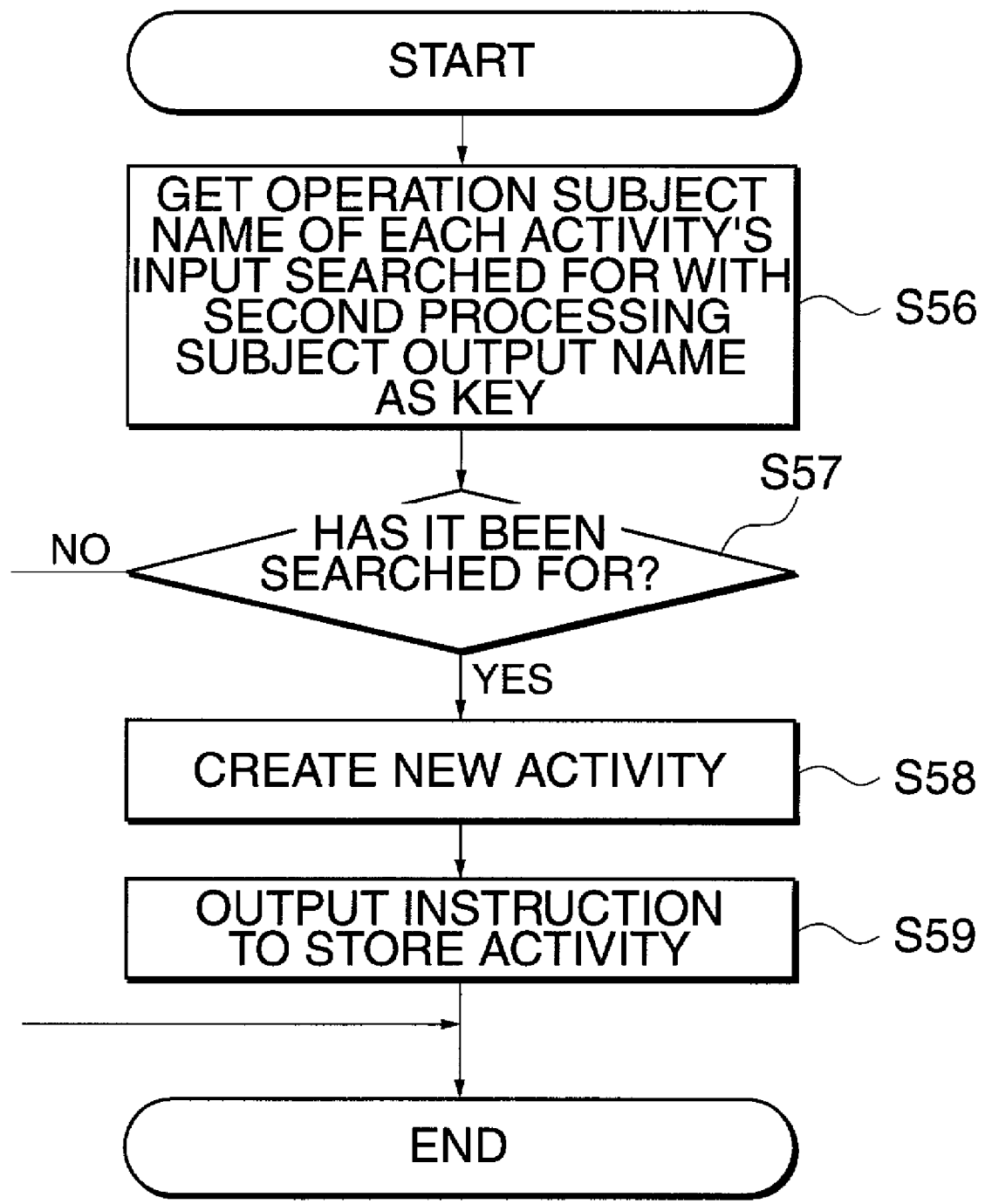
FIG. 10 is another flowchart of processing by the compounding processor 32.

On the other hand, the compounding processor 32 performs the following steps of processing in parallel with step S52 through step S55. Thus, as shown in FIG. 10, with the output name of the new activity extracted at step S51 as a key, the searching processor 33 is caused to search the activity database with the operation subject name of the input of each activity as the subject of searching (S56). In response to the input of a reply from the searching processor 33, it is checked whether or not there is an activity matching the request for searching (S57) and, if there is an activity matching the request for searching (if the reply is "Yes"), the new activity and the activity matching the request for searching are combined by applying rules of activity compounding to be described later on to create a new activity (compound activity) having these as subtasks (S58), and an instruction to store this compound activity is recursively given to the control unit 11 (S59) to end the processing. This results in detection and generation of a new value chain based on the contextual relationship between activities. If at step S52 and step S56 plural activities are found matching the request for searching, processing to create a compound activity is carried out by applying the rules of activity compounding to these activities.

While the example cited here concerns a case in which the compounding processor 32 executes processing upon receiving an instruction to store a new activity, it is preferable, because the quantity of computation by this compounding processor 32 increases with the number of activities, to execute it in a period of time during which the load on the control unit 11 is light irrespective of the presence or absence of an instruction to store a new activity. In this case, the processing is accomplished by selecting, as desired, out of the activities already stored in the activity database any desired activity that can be the subject of processing, and extracting the operation subject names of the input and the output of this selected activity as respectively the input name and the output name. Further it is desirable for this compounding processor 32, in view of the load of computation thereon, to be enabled in advance to interrupt processing when a prescribed length of time has elapsed after the start.

It may be relevant to explain the rules of activity compounding here. The rules of activity compounding, as illustrated in FIG. 11, constitute a database in which compound patterns and interpretations are correlated to each other, and are stored on the hard disk 14. According to these rules of activity compounding, for instance, an activity to "create" an operation subject name "X" (represented by CREATE (out: X) in the figure) and an activity, with the input of the operation subject name "X" being received, to "modify" it into an operation subject name "Y" (MODIFY (in:X, out:Y) in the figure) are compounded into an activity to "create" the operation subject name "Y" indicated in the matching interpretation.

Thus the compounding processor 32, at step S54 or S58, searches the rules of activity compounding with the operation name of the new activity, the input name and the output name, together with the operation name of the activity found matching step S52, and the operation subject names to constitute the input and the output as the keys, and creates a compound activity in accordance with the corresponding interpretation. Incidentally, in this searching, for the operation name of the new activity and that of the activity matching the request for searching, the thesaurus database 42 may be referenced and the rule of activity compounding pertinent to a concept either superior or of the same level may be applied as well.

By this processing by the compounding processor 32, plural activities can be compounded to define a new compound activity and the discovery of a new value chain is thereby facilitated.

Figure 12:
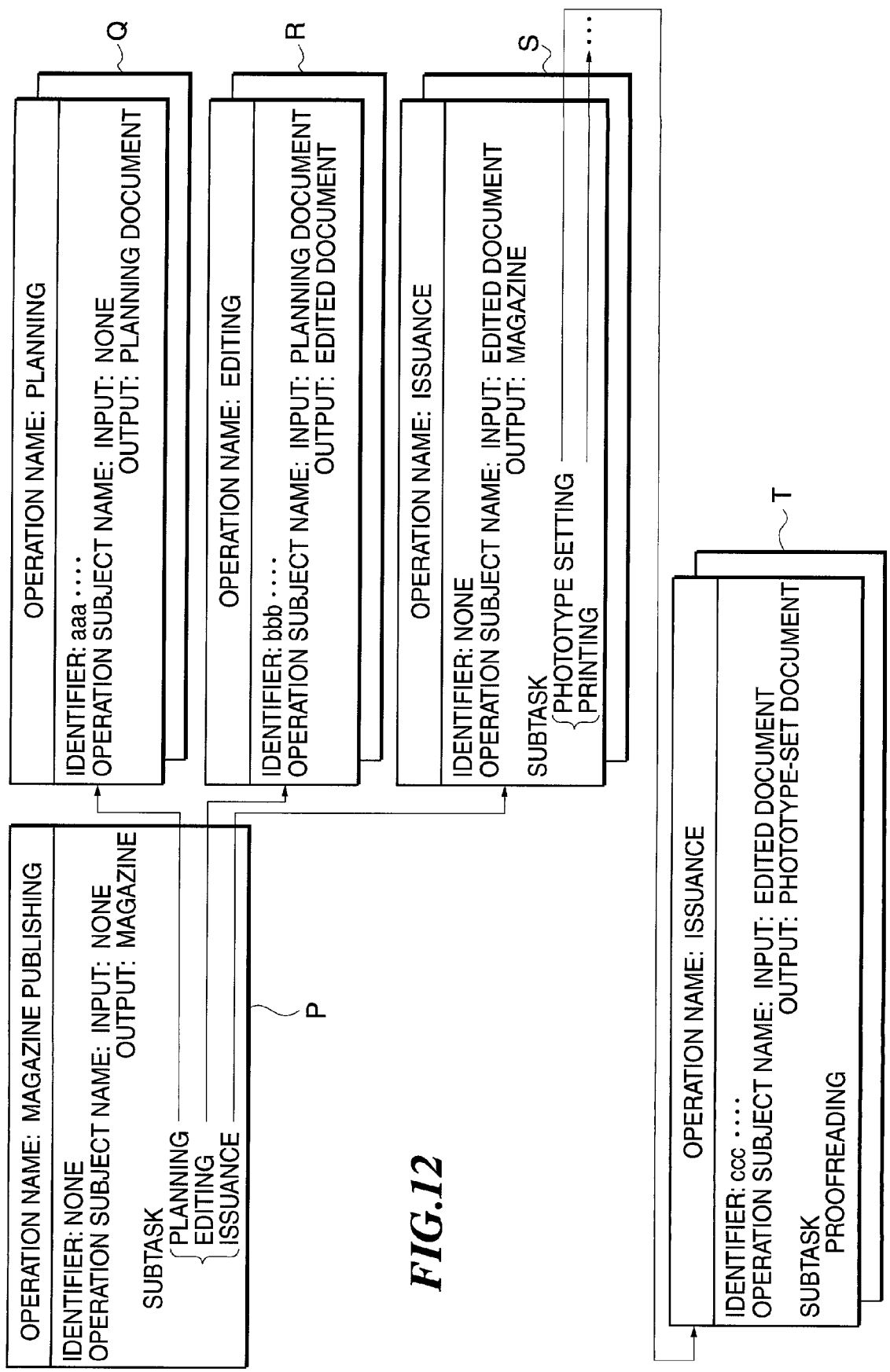
FIG. 12 illustrates activity data.

Next will be described the operation of the element organization support apparatus in the first embodiment of the invention with reference to a case in which a set of human and physical resources is organized for a customer to whom a "magazine publishing" service is to be provided. It is supposed that the operation name "magazine publishing" here has no matching subject name for input processing, the subject name for output processing is "magazine", and the activity database 41 stores the activities shown in FIG. 12. This information on the activities shown in FIG. 12 is an illustration of activity data shown in FIG. 2, simplified for the convenience of explanation, with the data linked to one another.

When the user manipulates the input unit 15 to input a request to search for human and physical resources for this "magazine publishing" service, the control unit 11 processes this input to actuate the modeling processor 31, and starts processing with the "magazine publishing" as the goal.

The modeling processor 31, with the designated operation name "magazine publishing" as the key, gives an instruction to the searching processor 33 to search the activity database of the database unit 19 for activities, and the searching processor 33 searches for an activity having this "magazine publishing" as its operation name. Then, for "magazine publishing" an activity having no identifier (i.e. for which neither a human nor a physical resource is set) (an abstract activity), as illustrated in FIG. 12-P, is found by the search.

Upon receiving the input of this activity, the modeling processor 31 references the subtasks of this activity, detects that the subtasks are "planning", "editing" and "issuance", selects as a subtask the "planning" for instance, and recursively executes the processing shown in FIG. 6 with this subtask "planning" as a new goal. This recursive processing results in the generation of a hierarchical model.

Thus the modeling processor 31 starts new processing to cause the searching processor 33 search for an activity having the operation name "planning", which is designated as the goal. Then, the searching processor 33 finds in the activity database 41 plural activities Q having "planning" as their operation names and matching the request for searching, and judges with respect to each activity whether or not it is a real activity having a pertinent human or physical resource (whether or not an identifier is set). Any one found to be a real activity is stored into the RAM 12 as a candidate activity to be responsible for "planning" to end this recursive processing.

The modeling processor 31 further processes the operation name "editing" in the same way, stores a candidate of the real activity R responsible for "editing" into the RAM 12, and processes the operation name "issuance" in the same way. If the abstract activity S is found matching the request for searching with respect to this "issuance", it causes activities matching the subtasks "phototype setting" and "printing" of the activity to be searched for.

Here, even if a subtask "proofreading" is set for the activity T matching the operation name "phototype setting" as shown in FIG. 12, unless no activity corresponding to this subtask is stored in the activity database 41, no activity corresponding to this subtask can be found by searching, and accordingly the processing to search for the subtask "proofreading" ends without storing anything into the RAM 12.

Figure 13:
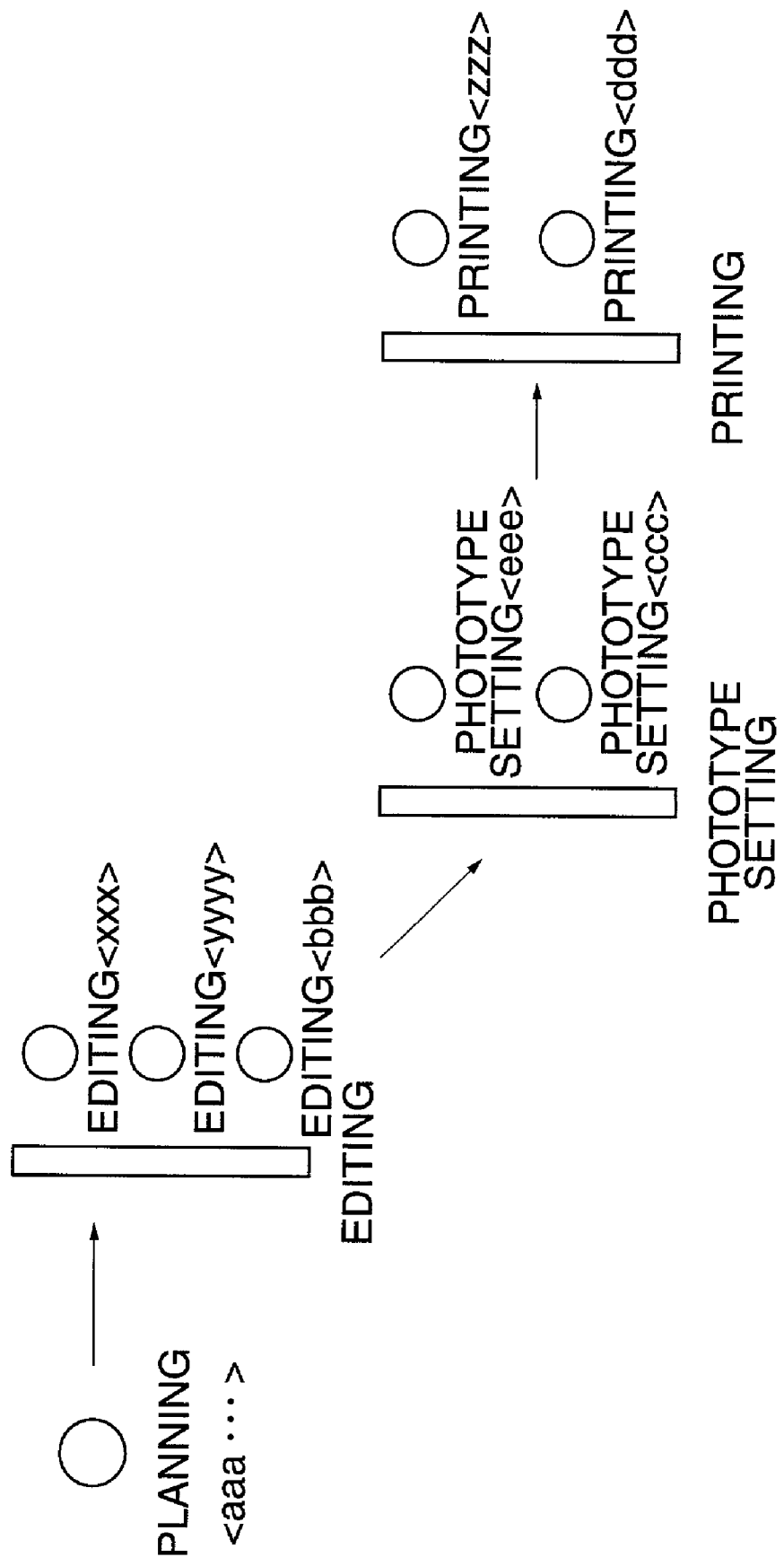
FIG. 13 illustrates one example of work process that has been generated.

In this way, on the basis of the initial designated goal (final goal) "magazine publishing", candidates of activities to process various tasks hierarchically are found by successive searching and stored into the RAM 12. Then the modeling processor 31 starts presentation processing and, since there is no input to "magazine publishing" but has "magazine" as its output, the RAM 12 is searched for an activity whose output is this "magazine". If the activity matching the request for searching here has, for instance, an operation name "printing", an input operation subject name "phototype-set document" and an output operation subject name "magazine", then the activity that can precede this activity is an activity of which the output operation subject name is "phototype-set document", and accordingly the RAM 12 is searched for an activity having "phototype-set document" as its output. Further in the same way, if the activity matching the request for searching has an operation name "phototype setting", an input operation subject name "edited document" and an output operation subject name "phototype-set document", then the operation subject name of the activity that can precede this activity has "edited document" as its output, and accordingly the RAM 12 is searched for such an activity. Thus is generated a work process for the project "magazine publishing" shown in FIG. 13, and supplied for displaying on the display unit 16. The user selects a preferable one out of the activity candidates displayed on the display unit 16.

When outputting this display, the modeling processor 31 may as well read out of the activity database 41 and display on the display unit 16, together with the activity candidates, information regarding skills in the respective activities. This enables the user to select each activity while watching pertinent skills, resulting in enhanced convenience. This skill information is particularly convenient when the thesaurus database 42 is used and, where an activity matching a concept superior to or of the same level as each operation subject name or operation name (an activity presumably having an equivalent task processing capability) is presented, and the activity closest in task processing capacity to the required activity is to be selected.

If here is added a new activity of which the operation name is "proofreading", the input operation subject name is "phototype-set document" and the output operation subject name is "proofread phototype-set document", at the next searching, this newly added activity corresponding to "proofreading" will be found by searching as a subtask of the activity T corresponding to "phototype setting" shown in FIG. 12, and a work process will be generated in presentation processing as the new activity is related to the "printing" activity whose input operation subject name includes "proofread phototype-set document".

In this way, the element organization support apparatus in this embodiment manages activities as executive elements as classified into operation names as processible tasks and searching is accomplished using these as the keys, and accordingly there is no need for processing to maintain contextual relationships when adding a new activity, making it possible to add any new activity easily.

Furthermore, this newly added "proofreading" activity and the "phototype setting" activity are compounded by the compounding processor 32, and a new activity of which the input operation subject name is "edited document" and the output operation subject name is "proofread phototype-set document" (the operation subject name in this case may be either "proofread phototype-set document" which is the output operation subject name itself or "converted document" which is a superior concept) is created, and stored into the activity database 41 to be available for use in searching next time onward.

In this way, the element organization support apparatus in this embodiment can detect a new activity combining plural activities as executive elements, and facilitates the detection of a new value chain.

Furthermore, in this embodiment, the modeling processor 31, at step S4 in FIG. 6, repeats its search for activities until a human or a physical resource is identified, the repetition may end with the exhaustion of subtasks instead of the identification of a human or a physical resource. In this case, instead of knowing the end of processing by the flag indicating whether or not a human or physical resource has been identified, the repetition will continue until the completion of subtask searching for each activity. Although this takes a longer processing time, it has an advantage of a greater variety of the organization of elements (activities) that can be presented to the user, and the searching will cover subtasks set for real activities, and the discovery of a value chain is thereby facilitated.

Furthermore, although it was explained that the individual activities are classified and management with operation names as the sole keys in this embodiment described above, the classified management may as well use as the keys not only the operation names but also sets of operation names and processing subject names. Thus, in this case, processable tasks according to the invention respectively match these pairs of operation names and processing subject names. More specifically in this instance, as illustrated in FIGS. 2 and 3, each subtask is represented by a pair of an operation name and a processing subject name, and the modeling processor 31, when causing the searching processor 33 to search for a subtask, can do with an operation name and an interface (an operation subject name) as the keys.

In this manner, a hierarchical model and a work process can be generated while taking into account the context of task processing, and the subsequent presentation processing can be simplified accordingly. Thus, as this way of searching results in the generation of a hierarchical model and a work process of input/output relations of operation subject names including the contextual relationships among activities as executive elements, a work process consistent in context can be immediately presented without having to going through the presentation processing illustrated in FIG. 8.

Further in this embodiment, instead of carrying out processing while assigning specific activities to different parts of a work process as described above, it is also acceptable first to constitute a work process (in this case this work process corresponds to the hierarchical model according to the invention) of abstract activities and then to search for real activities each matching the operation name and the operation subject name (including both the input and the output).

Thus in this case, in the activity database, abstract activities corresponding to individual activities are defined without fail. To realize this, when adding a new activity, the control unit 11 can cause the searching processor 33 to check whether or not there is an abstract activity corresponding to the operation name and the operation subject name of the new activity and, if no such abstract activity is found, extract only the operation name and the operation subject name of the new activity to define an abstract activity to store it into the activity database 41.

Figure 14:
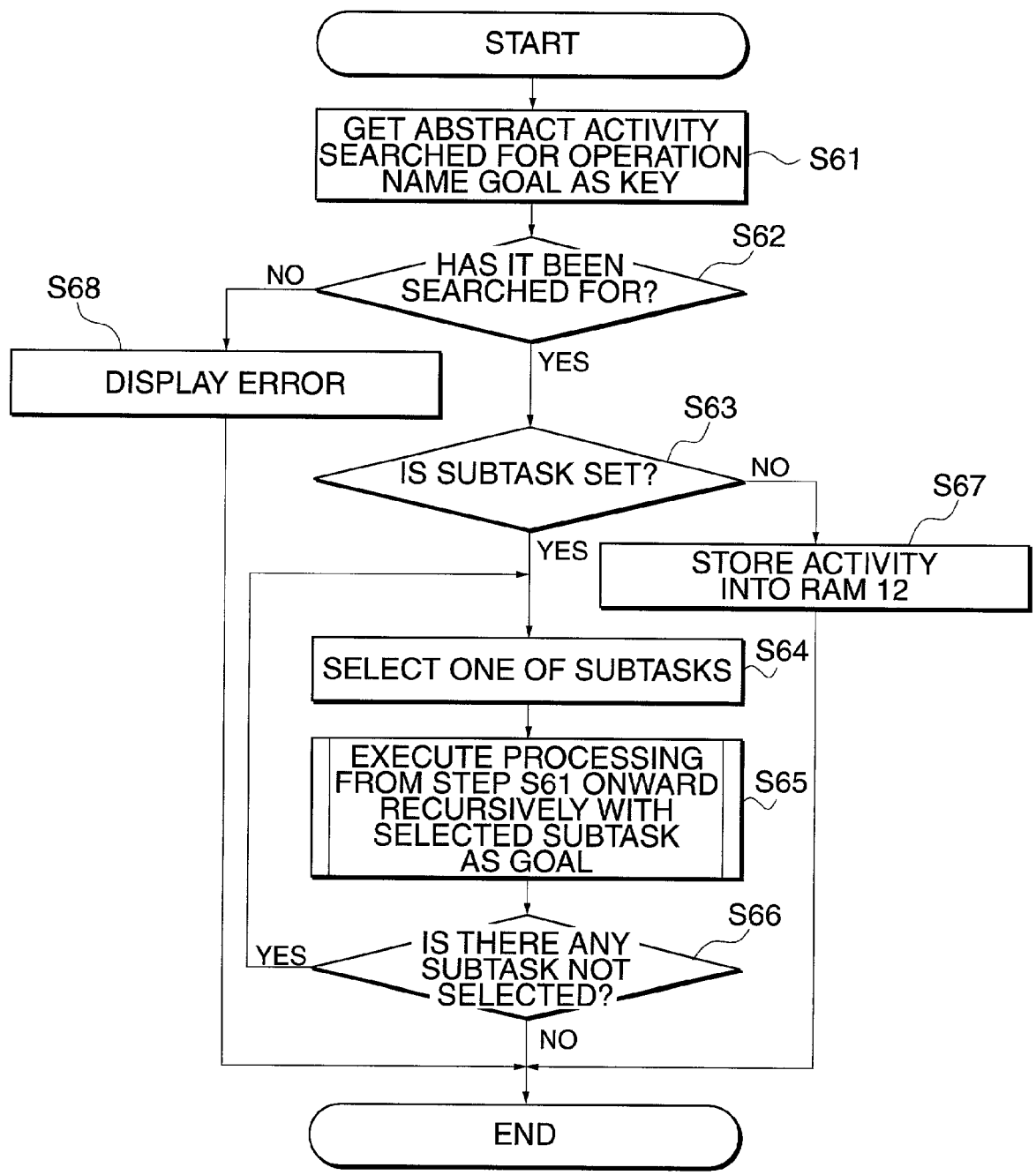
FIG. 14 is a flowchart of another way of processing by the modeling processor 31.

And in this case the modeling processor 31 of the control unit 11 performs the processing in FIG. 14 instead of that illustrated in FIG. 6. Thus the control unit 11 in this case makes a request for searching to the searching processor 33 with the operation name of the designated goal as a key and solely the abstract activity as the subject of searching (S61).

It then checks whether or not there is a corresponding abstract activity (S62) and, if there is any abstract activity matching the request for searching (if the reply is "Yes"), further checks whether or not any subtask is set for the abstract activity matching the request for searching (S63). If at this step S63 it is found that any subtask or subtasks are set (if the reply is "Yes"), it selects one of the subtasks (S64), and recursively executes the processing from step S61 onward with the selected subtask as the goal (S65). Upon completion of the recursive processing, it further checks whether or not there is any unselected subtask or subtasks (S66) and, if there is found any unselected subtask (if the reply is "Yes"), it selects one of the unselected subtasks and repeats the processing from step S64 onward. Or if at step S66 no unselected subtask is found (if the reply is "No"), the processing is ended.

If at step S63 no subtask is set (if the reply is "No"), the pertinent abstract activity (as in this case no subtask is set either, it is a fully abstract activity) is stored into the RAM 12 as the activity corresponding to the task (S67) to end the processing. If further at step S62 there is no abstract activity matching the request for searching (if the reply is "No"), an error message is displayed on the display unit 16 (S68) to end the processing.

The modeling processor 31, while carrying out the processing shown in FIG. 8 as presentation processing, causes the searching processor 33 to search for a real activity corresponding to the operation name and the operation subject name of each activity (abstract activity ) and related to a human or physical resource when presenting candidate activities at step S46, and presents the result of the searching as candidates. Thus, first the skeleton of a work process is formed solely of abstract activities, and afterwards a real activity is searched for and presented corresponding to each of the activities constituting this skeleton and related to a real human or physical resource, resulting in facile addition, destroying or modification of real activities, because the work process is formed in advance of abstract activities, and accordingly the addition, destroying or modification of real activities does not directly affect the generation of the work process. At step S67 of the control unit 11 as well, not only the pertinent fully abstract activities are stored into the RAM 12 but also the first exceptional processing described earlier may be performed.

Next will be described an element organization support apparatus in a second embodiment of the present invention. The element organization support apparatus in this embodiment, whose configuration is basically the same as the element organization support apparatus in the first embodiment of the invention illustrated FIG. 1, differs in that its control unit 11 executes processing after the presentation of a work process. Thus the element organization support apparatus in this embodiment, operating in the same way as the element organization support apparatus in the first embodiment, presents a work process on the display unit 16, and carries out processing to present information with reference to which the user can choose from the presented activity candidates and combinations of activity candidates. Therefore, only this processing to present information performed by the control unit 11 will be described below.

More specifically, the control unit 11 in this embodiment presents, as reference information for the user's choice, the estimated processing time and cost of carrying out the project in the presented work process, together with information based on customers' evaluations of organizations in the past.

Figure 15:
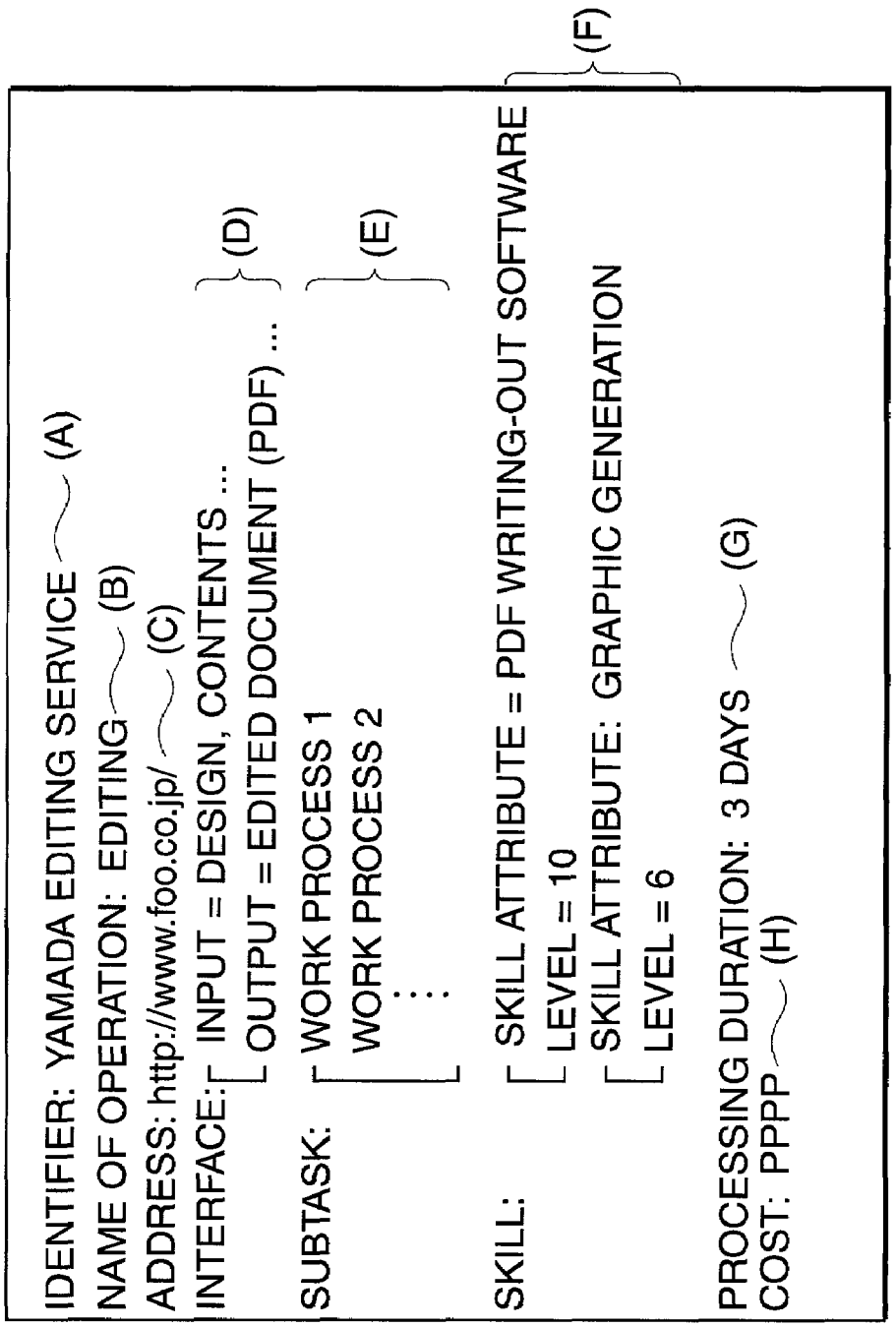
FIG. 15 illustrates another example of activity data.

The activity database 41 in this embodiment, as illustrated in FIG. 15 which corresponds to FIG. 2, stores the length of time required for the processing (processing time) (G) and the cost of the processing (cost estimate data) (H) in addition to the identifier, operation name, address, interface, subtasks and skills (A through F) as related to each activity.

Figures 16, 17:
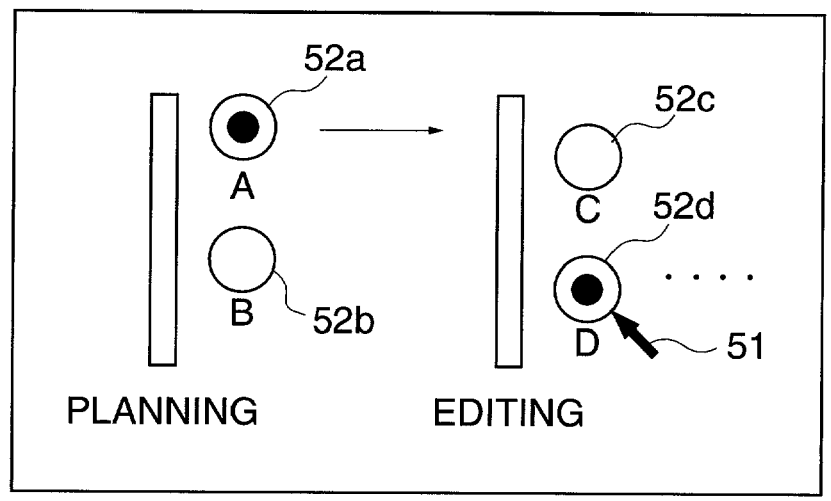
FIG. 16 illustrates one example of evaluative information.
FIG. 17 illustrates one example of display performed by a control unit 11 toward a display unit 16.

The control unit 11 receives information on the customers' evaluation via the network control unit 17 or by an input from the input unit 15, and stores the evaluative information onto the hard disk 14. More specifically, this evaluative information stores information indicating how activities are combined (organized), the name of the customer who gave the evaluation and the evaluation score as related to one another as shown in FIG. 16. Incidentally, although the evaluation score is expressed numerically in FIG. 16, it may as well be ranked in a character or a sign.

Also this control unit 11, in displaying activity candidates on the display unit 16, if there are plural activity candidates for processing each task, references the activity database 41 for the processing times (G) of the activities, and rearranges them for displaying in the increasing order of the processing time. Or the control unit 11, receiving from the user via the input unit 15 the input of an instruction to rearrange the activities in the order of the cost instead of the processing time, references the activity database 41 for the cost (H) of each activity, and rearranges them in the increasing order of the cost. In this way, the control unit 11 arranges and displays the activities in one or another sequence as instructed by the user's input via the input unit 15.

The display given here by the control unit 11 on the display unit 16, as shown in FIG. 17, enables each activity for processing each task to be individually selected, In the example of FIG. 17, there are two activities corresponding to the task "planning", "A" and "B", either of which can be selected by the user, using a mouse which is the input unit 15, by clicking with a mouse cursor 51 the appropriate one of the radio button interfaces 52a and 52b. Instead of such buttons, a known interface, such as a pull-down menu, can as well be provided for selection.

Figure 18:
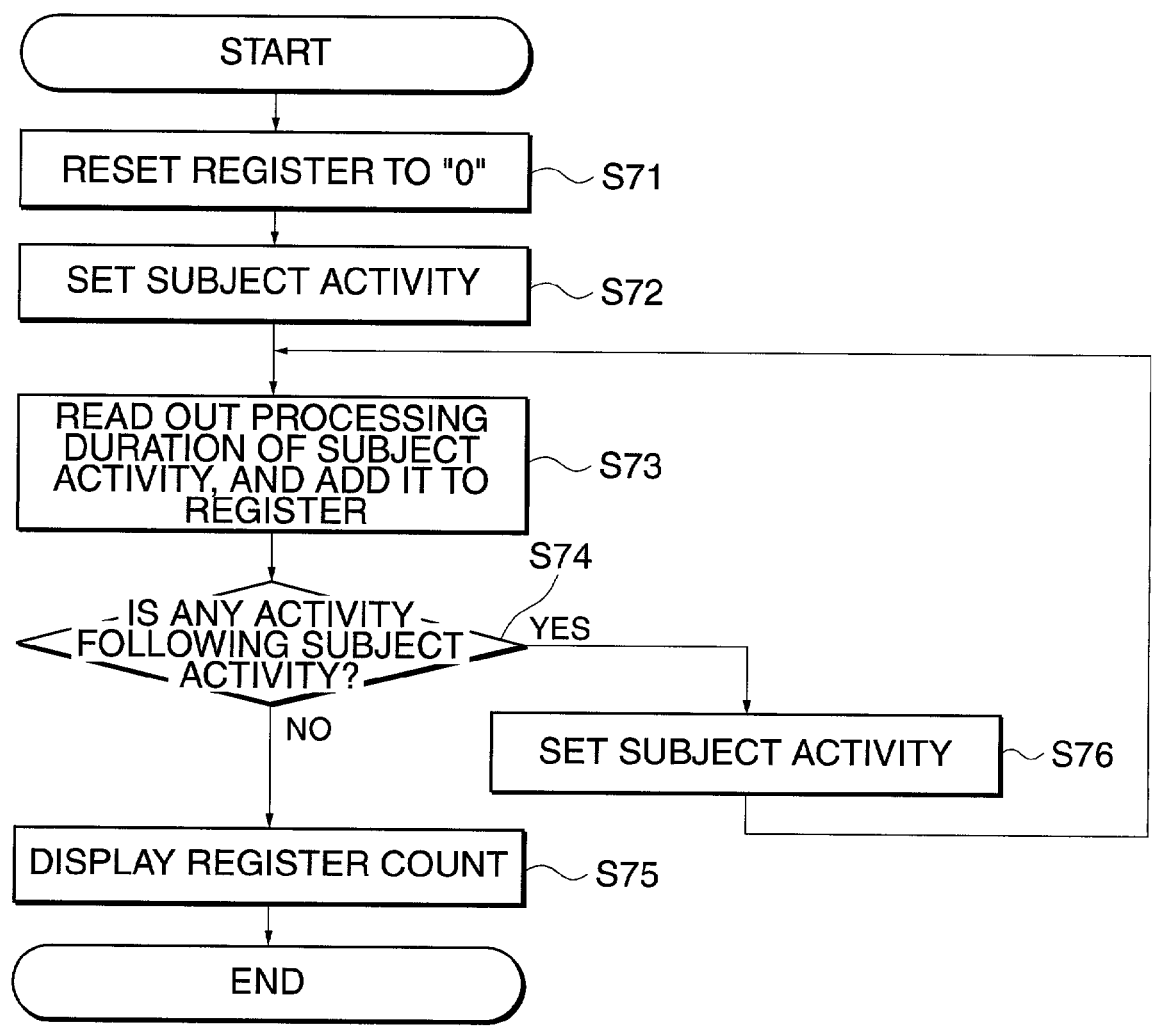
FIG. 18 is a flowchart of information presentation processing by the control unit 11.

Further the control unit 11 processes information presentation to compute and present the overall processing time and cost of the whole work process and evaluative information on each work process. Thus the control unit 11, upon presenting the work process, starts execution of the information presentation processing shown in FIG. 18, secures a register in the RAM 12, resets it to "0" (S71), searches for any activity which is to be the start point of the presented work processes (an activity linked to no preceding activity) and is currently selected by the user by the above-described manipulation, and sets that activity as the subject (S72). It then reads out the processing time of the activity set as the subject, adds it to the register (S73), and further checks whether or not there is any activity following the activity set as the subject (S74). If there is no following activity (if the reply is "No"), the value of the register is displayed on the display unit 16 as the total length of time needed for the accomplishment of the project (S75) to end the processing.

Or at step S74 any following activity or activities are found (if the reply is "Yes"), the activity selected by the user out of the following activities is set as the subject (S76), and the processing is continued, back from step S73 onward.

Whereas the example described above is a case in which the processing time of a whole work process is computed, a detailed description of the computation of the overall cost of a work process is dispensed with here because it can be implemented by similar processing.

Further the control unit 11, receiving the input of an instruction to display evaluation from the user via the input unit 15, searches for evaluative information stored on the hard disk 14 using as a key the set of activities selected as executive elements for accomplishing a task. For instance, if the selected activities are "A", "D" and "E", it searches for evaluative information on this set, and displays it on the display unit 16.

Next will be described the operation of the element organization support apparatus in this embodiment. In the following description, the element organization support apparatus in this embodiment is supposed to be installed on the part of a temporary help business. The temporary help business, requested by one of its customers to provide a combination of human and physical resources needed to provide, for instance, a "magazine publishing" service, operates the input unit 15 of the element organization support apparatus in this embodiment to enter the request. Then in a similar operation to the element organization support apparatus in the first embodiment already described, real activities as executive elements to execute the plural tasks constituting the "magazine publishing" project are found by searching.

Then the control unit 11 in this embodiment reads out the processing time related to a real activity related to each of the tasks, rearranges the activities in the increasing order of the processing time, and displays them on the display unit 16. Now, as the temporary help business, which is the user, operates the input unit 15 to select a real activity responsible for each task, the control unit 11, on the basis of the combination of the selected real activities, computes by information presentation processing the total time required for the magazine publishing project, and displays it on the display unit 16.

Then, as the user gives an instruction via the input unit 15 to compute the total cost of accomplishing the project, the control unit 11, by similar information presentation processing, displays the total cost on the display unit 16. In doing so, it is also preferable for the control unit 11 to read out cost information related to the real activity selected for each task and rearrange the activities in the increasing order of cost for displaying.

Then the control unit 11 checks whether or not evaluative information corresponding to the selected set of real activities is stored on the hard disk 14 and, if it is, displays that evaluative information together on the display unit 16. It is also preferable to compute, in addition to this display, the average of evaluative information and separately display it as an overall evaluation.

The temporary help business who is the user organizes executive elements made up of human and physical resources on the basis of the conditions presented to the customer, the total time and cost, and the evaluative information, and loans human and physical resources on the basis of this organization.

In the meantime, when the customer tells the temporary help business of its evaluation of the proposed organization of human and physical resources, the user operates the input unit 15 to enter the evaluation together with the organization of human and physical resources and customer information, and stores them, related to one another, into the hard disk 14.

Although the organization support apparatus in this embodiment was treated as a single apparatus in the foregoing description, it may as well be implemented as a system provided with a database server, which includes the activity database 41, for receiving a request for searching for an activity and transmitting, in compliance with the request, information on an activity meeting the conditions of searching (since abstract activities are not discriminated in this case, this database server also functions as a task description server), an analytical server for carrying out modeling as requested (or at least a selection server for generating only a hierarchical model based on abstract activities) and a reception server for receiving inputs from the user in place of the input unit 15, and in which the servers are connected to one another via a network. In this case, by using the reception server as a web server or a similar server released via the Internet to present to a client apparatus, in place of the display unit 16, information to be otherwise displayed on the display unit 16 in a document format which is a de facto standard on the Internet such as HTML or XML, requests from the client apparatus on the part of the customer can be directly accepted to organize elements, resulting in increased convenience for the customer. In this case, however, in order to prevent information on human resources related to real activities from leaking out, it is preferable to take a security measure, such as concealing human resources information or using passwords. A possible method for concealing human resources information is to relate a flag to each activity as to whether to display identifier information and not to let identifier information be included in the presentation of that activity by the control unit 11 to a client apparatus.

Further in such an arrangement, the customer may transmit evaluative information regarding the organization of human and physical resources by operating the client apparatus, and the hard disk 14 on the part of the system may store this evaluative information. Such a system can be implemented by using the known common gateway interface (CGI) program technique, a Java (trade mark) technique or the like.

Although real activities were explained as being related to human and physical resources in the foregoing description of the element organization support apparatuses in the first and second embodiments, they may as well be related to business corporations or other organizations. In this way, an element organization support apparatus according to the invention can be applied to outsourcing business.

[Execution of Work Process]

It is also conceivable that human resources or the like related to real activities to utilize apparatuses mutually connected via a network or that where physical resources are connected to a network, in accomplishing an actual project, information elements (tokens) representing the asking of the project are transmitted and received via a network to support the accomplishment of the project.

Thus in this case, tokens are exchanged among the executive elements of tasks in accordance with a work process generated in advance using one of the element organization support apparatuses described above or the like, and executive elements having received the tokens process the pertinent tasks.

Thus it is a system to support the execution of the work process, provided with executive element side apparatuses one of which is arranged for the executive element of each of plural tasks constituting a project, and each of the executive element side apparatuses includes a section for transmitting a token in accordance with a work process, a section for receiving and holding the token, and a section for outputting, upon reception of the token, an instruction to send a request for processing a task to an executive element. Instructions to send a request for processing here should preferably be displayed on the screen as a list to tasks to be done (so-called TODO list) on the executive element side apparatus, because this listing enables each executive element, when plural tokens are being held, the task processing for each token to be viewed at a glance, resulting in enhanced working efficiency.

In this case, it is also preferable to add time limit information according to the processing time of each task, being related to the token, and to display that time limit information together, because this enables each executive element side apparatus to inform the executive element of any task for which the time limit is coming very soon and thereby to further enhance the working efficiency of executive elements.

Furthermore, where this token is to be received by a physical resource as an executive element, it is advisable to perform preset task processing and to transmit the token to the executive element side apparatus for the task to be processed next in accordance with the work process.

There is another system for supporting the execution of this work process, further including a work server, upon receiving the result of task processing from an executive element side apparatus, storing that result of processing only when the executive element side apparatus is holding a token. This enables the project to be accomplished while keeping the secrecy of the result of processing of each task.

Still another system for supporting the execution of these work processes includes a management server for managing the state of token holding by each executive element side apparatus. This management server facilitates the management of workflow execution, and enables the party asking the project (customer or the like) to keep track of the progress of its accomplishment, resulting in enhanced working efficiency.

Conventional systems for managing a work process or a workflow include a reference model proposed by the Workflow Management Coalition (WfMC), an organization for the standardization of workflow management systems. This reference model is described in detail in "The workflow reference model" contained in David Hollingsworth, *Technical Report*, Workflow Management Coalition, 1995, which is cited here. While this model takes into account synergy among plural workflow engines (corresponding to executive elements here), but its basis is centralized control, with a low level of decentralization, resulting in difficulty of dynamically altering the work process. Where centralized control is accomplished as in this model, there is a need to manage requests for task processing to each executive element, inviting an increased load.

In view of these problems, here is proposed a system for supporting work process execution, which helps reduce the load of centralized management by transmitting and receiving tokens in accordance with the work process and facilitating dynamic alterations in the work process by merely changing the transmitting sequence of tokens.

Figure 19:
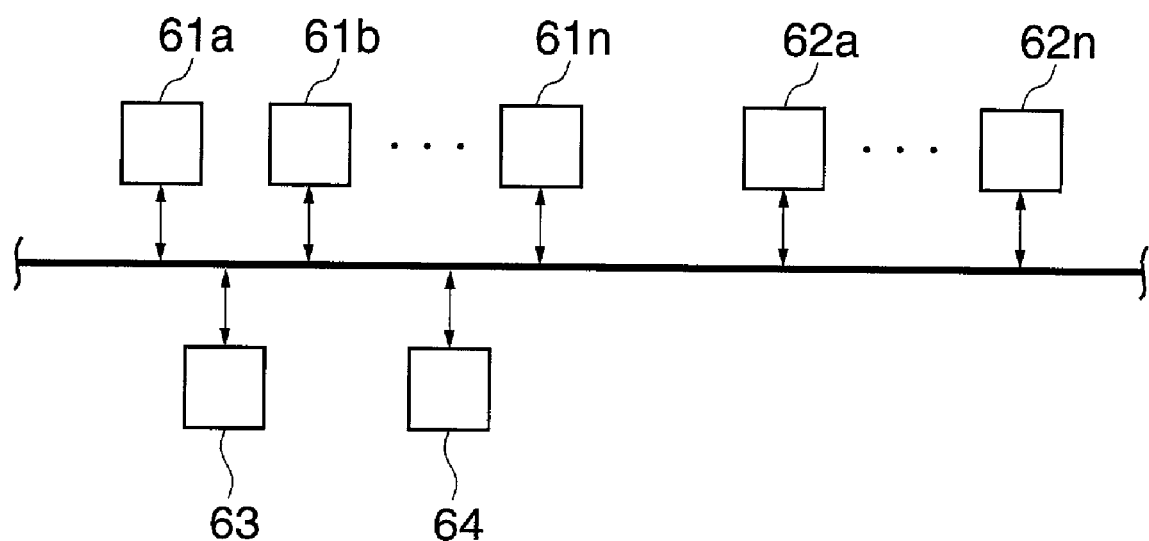
FIG. 19 is a structural block diagram of a system executing a work process.

To be specific, this system includes, as illustrated in FIG. 19, computers 61*a*, 61*b*, . . . , 61*n* used by human resources as executive elements for tasks, physical resources 62*a*, 62*b*, . . . , 62*n* as executive elements for tasks, a customer side apparatus 63 for managing the progress of the project, and a work space server 64 for providing a common work space for task processing, and the constituent parts are connected to one another via a network.

Figure 20:
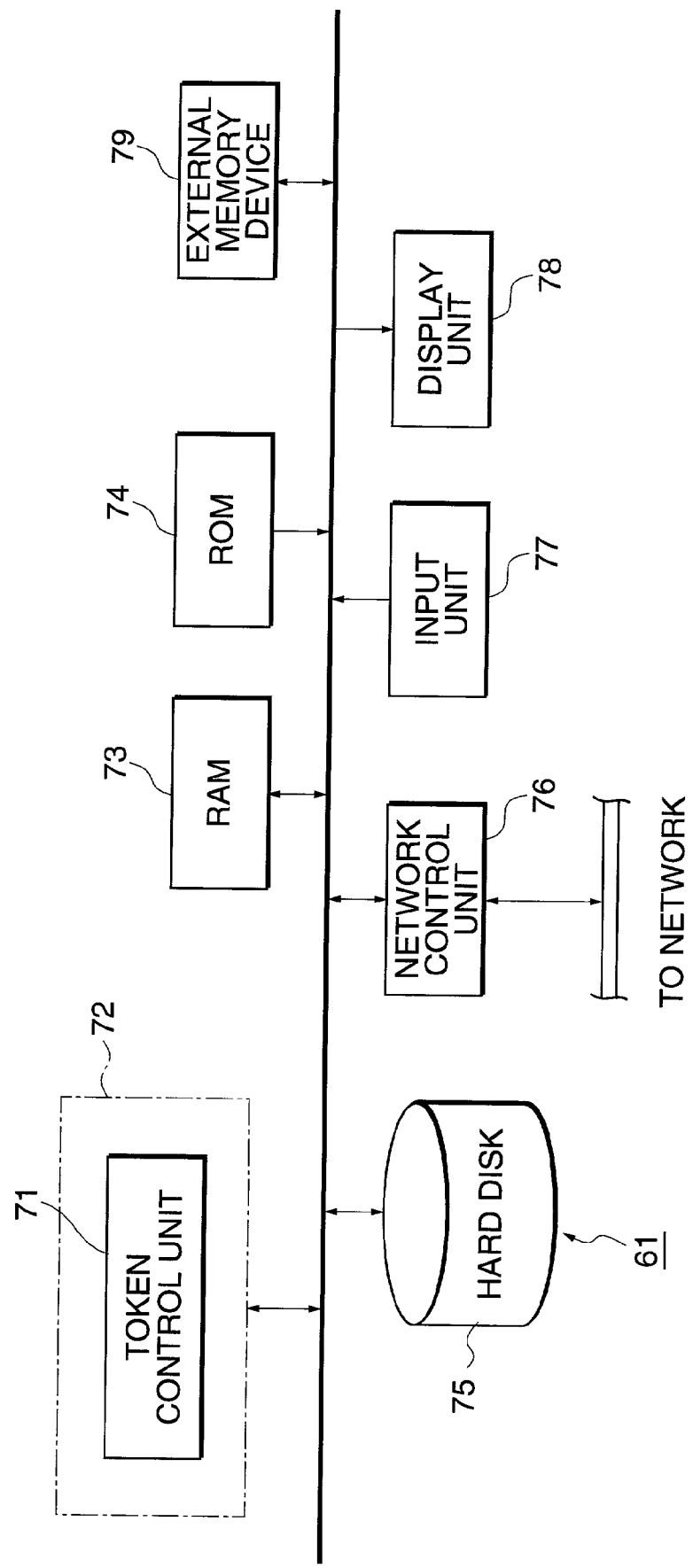
FIG. 20 is a structural block diagram of a computer used by executive elements in the system executing the work process.

Each computer 61, as illustrated in FIG. 20, basically has a CPU 72 including a token control unit 71, a RAM 73, a ROM 74, a hard disk 75, a network control unit 76, an input unit 77, a display unit 78 and an external memory device 79, which are connected to one another via a bus.

Each section will be described below in specific terms. The CPU 72 of each computer 61 carries out the processing of control over individual sections including token control processing with the token control unit 71, reception of inputs from the input unit 77 and the outputting of displays to the display unit 78. This token control unit 71 corresponds to the aforementioned section for outputting instructions to send processing requests. Details of specific processing by the token control unit 71 will be described afterwards.

The RAM 73 operates as a work memory for the CPU 72. The ROM 74 stores the actuation program to be executed at the time of actuating the CPU parameters. The hard disk 75 stores a basic program such as Windows (trademark) and various application programs to be processed by the CPU 72. In this hard disk 75 is also installed and stored the processing program for the token control unit 71. The hard disk 75 further holds tokens. The network control unit 76, connected to a network, receives data from outside, supplies them to the CPU 72, and transmits via the network data entered from the CPU 72. This network control unit 76 corresponds to the aforementioned section for transmitting tokens and that for receiving tokens.

The input unit 77 is an input device such as a keyboard or a mouse for outputting the operation by the user to the CPU 72. The display unit 78 displays data in accordance with an instruction inputted from the CPU 72. The external memory device 79 reads out data out of a computer-readable storage medium such as a floppy disk or a CD-ROM, which optically or magnetically records and holds data, and installs it on the hard disk 75.

The physical resources 62, connected to the network, holds tokens it receives via the network and carries out preset processing, upon completion of which it transmits the tokens via the network. Also the physical resources 62, upon receiving via the network a request to search for a specific token, checks whether or not that specific token is held and, if it is, transmits an affirmative reply.

The customer side apparatus 63, which corresponds to the aforementioned management server, issues a request to search for a specific token to the computers 61 and the physical resources 62 upon receiving the input of an instruction from the user (customer) of this customer side apparatus 63, transmits it via the network, receives the reply, and outputs for displaying on a display unit (not shown) information indicating which computer 61 or physical resource 62 is holding that specific token.

The work space server 64, corresponding to the aforementioned work server, accumulates data on the results of task processing received from the computers 61 or the physical resources 62 via the network. This work space server 64, upon receiving data on the results of task processing received from a computer 61 or a physical resource 62, transmits a request to search for a token to that computer 61 or physical resource 62. If no token matching the request for searching is found (if the computer 61 or the physical resource 62 having transmitted data on the result of that task processing holds no token), the work space server 64 discards the received data on the result of task processing or, if there is a token matching the request for searching, it stores the data.

Now will be described processing by the token control unit 71 in the computer 61 with reference to FIG. 21. The token control unit 71 starts processing upon receiving the input of a token from the network control unit 76, stores the token into the RAM 73 (S81), and causes the receipt of the token to be displayed on the display unit 78 (S82). The token control unit 71 then checks whether or not an instruction indicating the end of task processing has been entered from the user via the input unit 77 (S83) and, if no such instruction is entered (if the reply is "No"), repeats the execution of step S83 and waits for its entry.

Or if at step S83 an instruction indicating the end of task processing has been entered (if the reply is "Yes"), the token control unit 71 references tokens stored in the RAM 73, detects a work process (S84), and checks whether or not there is any following task (following executive element) on the work process (S85). If there are any following executive element (if the reply is "Yes"), it extracts a URL for the executive element from the work process (S86), and gives an instruction to transmit a token to that URL to the network control unit 76 (S87) to end the processing.

Or if there is no following executive element at step S85 (if the reply is "No"), it discards the token (S88) to end the processing.

Further this token control unit 71, upon receiving from the network control unit 76 the input of an instruction to search for a specific token, search the tokens stored in the RAM 73 for that specific token. If that specific token is found at the request for searching, it transmits a reply to the effect that the specific token is being held.

Figure 21:
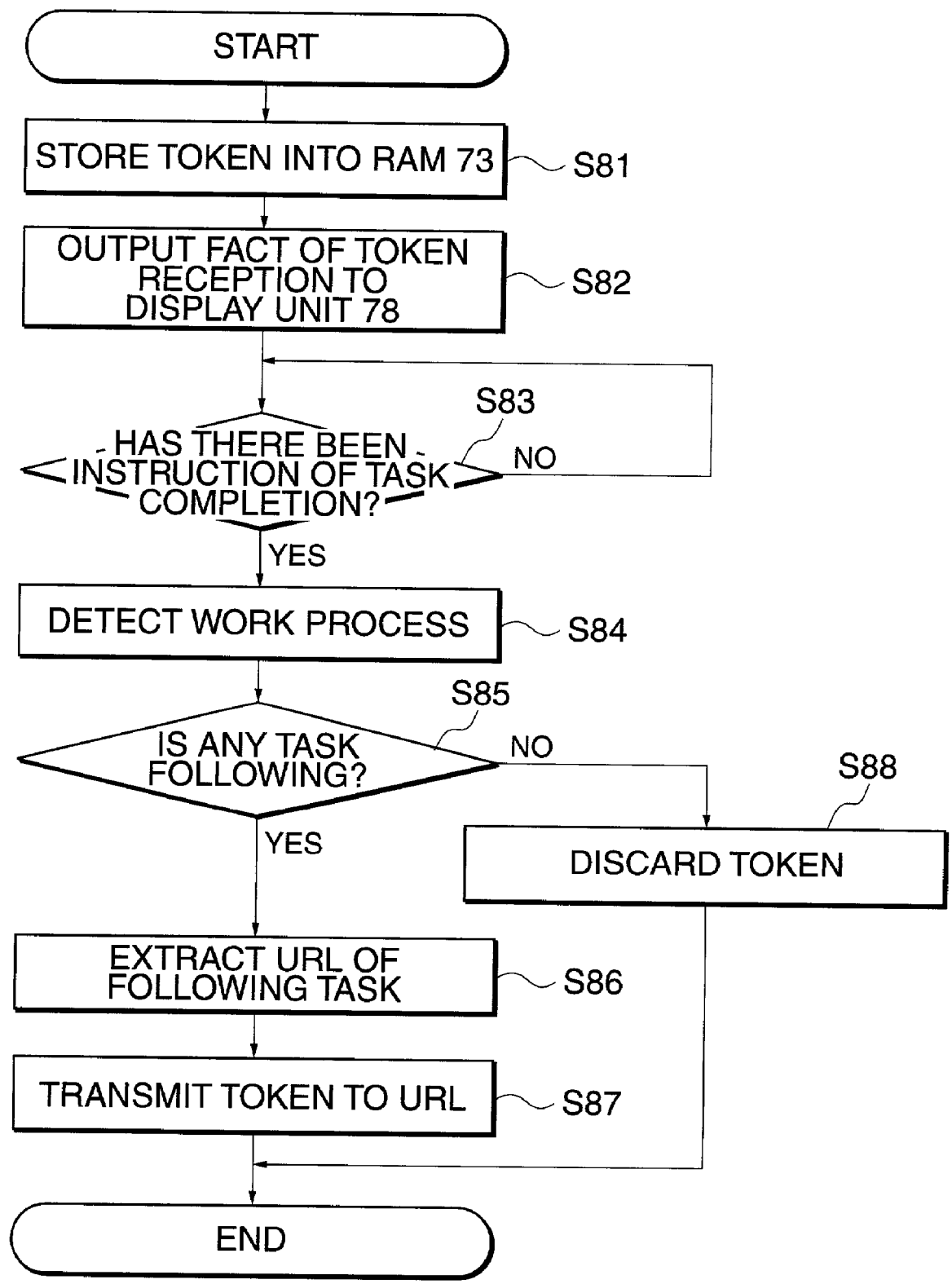
FIG. 21 is a flowchart of processing by a token control unit 71.
Figure 22:
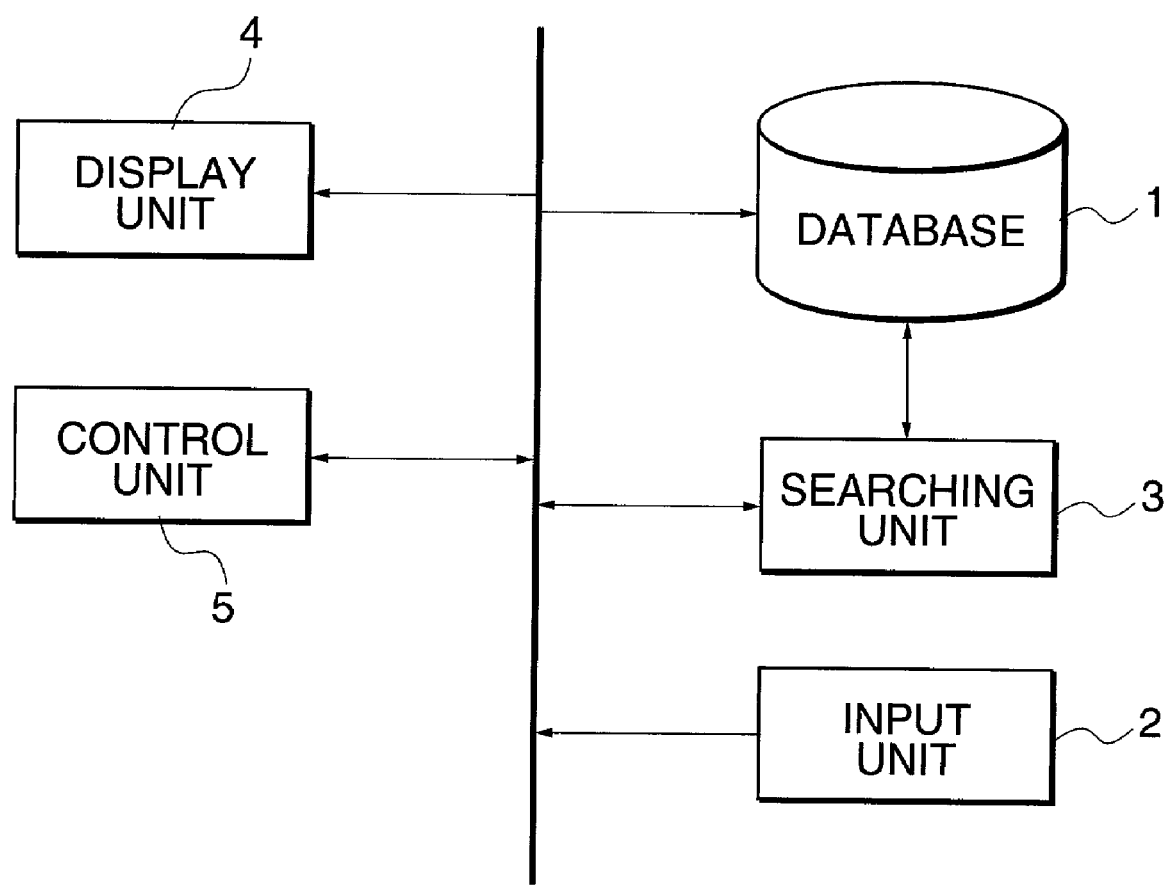
FIG. 22 is a structural block diagram of an example of conventional workflow generation support apparatus.

Although it is supposed that the token is to be discarded at step 88 in FIG. 21, the token may be transmitted to the customer side apparatus 63 instead of discarding it. In this case the URL of the customer side apparatus 63 may be set in the token.

Further, although the foregoing description reference to an instance in which the tokens to be transmitted and received are exchanged between the computers 61 and/or the physical resources 62 in accordance with the sequence of task processing in the work process, information on the work process may be extracted from the received token and discarded and a new token may be issued on the basis of information on the pertinent work process when one is to be transmitted, if the sequence of the work process is followed. Or, for instance, where the work process can be processed in parallel, a token may be divided and transmitted. In this case, the processing is started when the executive elements waiting for the results of processing from the plural tasks have received all the divided segments of the token.

According to the present invention, as there is provided an element organization support apparatus in which, for a project made up of plural tasks, an executive element is selected for each task and, to support the organization of plural executive elements, an executive element management section classifies each executive element into processible tasks and manages them, and a selecting section selects candidate executive elements that can process tasks, the selection of candidate executive elements with the processible tasks as keys enables candidate executive elements to be selected for accomplishing a given project irrespective of the contextual relationships among the tasks, thereby making possible ready addition, deletion or modification of executive elements with no need for processing to maintain the contextual relationships.

Moreover, since candidate executive elements are selected with the processible tasks as the keys irrespective of the contextual relationships, even if executive elements are under decentralized management in plural databases, there is no need to cause the input/output relationships ensuing from the addition, deletion or modification of executive elements in each database to be reflected in other databases, resulting in efficient decentralized management.

Further according to the invention, operations to be accomplished by a modeling section are arranged in a hierarchy of tasks, and the selecting section selects at least abstractly defined executive elements as related to the tasks so arranged, with the result that, where tasks are abstractly defined there is no executive element that can process a task, it is possible to objectively judge what kind of executive element is required, making it possible to generate a flexible work process.

Further according to the invention, there is provided an element organization support apparatus in which a task description storage section stores plural task descriptions defined according to rules of hierarchization and plural tasks each corresponding to one of the task descriptions, a modeling section generates a hierarchical model by hierarchically combining plural task descriptions according to the subject project, and a selecting section selects the candidate executive elements for implementing the subject project in accordance with this hierarchical model, the mutual independence between the addition, deletion or modification of executive elements and the generation of the hierarchical model to accomplish the subject project is strengthened by generating a hierarchical model to accomplish the subject project by hierarchically combining abstract task descriptions in accordance with the rules of hierarchization and subsequently selecting candidate executive elements each corresponding to one of the task descriptions. Once the rules of hierarchization are defined, when the addition, deletion or modification of any executive element is to be carried out, there is no need to take into account relationships with other executive elements, thereby facilitating the addition, deletion or modification of executive elements.

Also the invention provides a method of providing supporting to the organization of elements, including a step of classifying plural executive elements for executing tasks constituting various services in advance into processible tasks and managing them, in which the executive elements include at least one of human and physical elements, a step of receiving a request for organizing, for the accomplishment of a specific service asked by a customer, executive elements for processing the specific service, a step of analyzing, as instructed by the customer, tasks required by the specific service, and a step of selecting from the executive elements classified and managed, on the basis of the result of the analysis, the executive elements to execute the tasks. Therefore, it is made possible to organize executive elements in a manner matching a project asked by a customer or a specific service, and to easily achieve element organization suitable for outsourcing.

The invention can display evaluation by feedback from the customer and thereby make possible more efficient organization of elements by adding to the method a step of making the customer evaluate the result of the organization of executive elements and a step of receiving the evaluation and hold it in association with information concerning the organization of the executive elements provided to the customer.

What is claimed is:

1. An element organization support apparatus for selecting, for a project including plural tasks, executive elements for individual tasks and supporting organization of the plural executive elements, the apparatus comprising:
   a control unit that:
      classifies executive elements that indicate activities to carry out a task into processible tasks and manages the classified executive elements;
      selects a candidate executive element that can process a task of a project that includes plural tasks, the selecting being based on the classification;
      searches operation names representing processible tasks in a thesaurus database and checks whether any of the operation names in the thesaurus database matches a request for searching the classified executive element by operation name; and
      when a match is found, recursively executes another search using the operation name found in the thesaurus database.

2. The element organization support apparatus according to claim 1, further comprising a memory for storing at least element information that identifies a task processible by each executive element, and the control unit selects, on the basis of the element information, the candidate executive element for processing each task required in the project.

3. The element organization support apparatus according to claim 2, wherein the element information further includes data regarding processing time, and the control unit, when there are plural candidate executive elements for a given task, rearranges the plural candidate executive elements according to the processing time and presents the candidate executive elements.

4. The element organization support apparatus according to claim 1, wherein each one of the classified executive elements identifies an activity which is stored as an identifier in a database.

5. The element organization support apparatus according to claim 1, wherein the candidate executive element is selected based on at least one of the operation name and an operation subject name of the classification.

6. The element organization support apparatus according to claim 1, wherein each one of the processible tasks is represented by a name of operation.

7. An element organization support apparatus for selecting, for use in the accomplishment of a job asked by a customer, an executive element that indicates an activity to carry out a task involved in the job, and supporting the organization of the plural executive elements to accomplish the job, comprising:
   a control unit that:
      classifies executive elements into processible tasks and manages the classified executive elements;
      selects a candidate executive element that can process the task of the job, the selecting being based on the classification;
      searches operation names representing processible tasks in a thesaurus database and checks whether any of the operation names in the thesaurus database matches a request for searching the classified executive element by operation name; and
      when a match is found, recursively executes another search using the operation name found in the thesaurus database.

8. A device implemented service providing method, comprising:
   classifying plural executive elements that indicate activities to carry out a task constituting various services into processible tasks in advance and managing the classified executive elements, each of the executive elements including at least one of human and physical elements;
   receiving a request for organizing, for the accomplishment of a specific service asked by a customer;
   analyzing, by a processor, as instructed by the customer, a task required for the specific service;
   selecting by a processor from the executive elements classified and managed, on the basis of the result of the analysis, a candidate executive element for executing the task required for the specific service, the selecting being based on the classification;

searching by a processor operation names representing processible tasks in a thesaurus database and checking whether any of the operation names in the thesaurus database matches a request for searching the classified executive element by operation name; and when a match is found, recursively executing another search using the operation name found in the thesaurus database.

9. The device implemented service providing method according to claim 8, further comprising:

allowing the customer to evaluate the result of the organization of the executive elements; and receiving, as the organizer of the executive elements, the evaluation and holding the evaluation in association with information concerning the organization of the executive elements provided to the customer.

10. An element organization support method executable by a processor for selecting, for a project including plural tasks, executive elements that indicate activities to carry out a task and supporting organization of the plural executive elements, the method comprising:

classifying by the processor the executive elements into processible tasks in advance and managing the classified executive elements;

searching by the processor the executive elements classified and managed for a candidate executive element to execute a task of a project that includes plural tasks and selecting the candidate executive element from the executive elements classified and managed that can process the task, the selecting being based on the classification;

searching by the processor operation names representing processible tasks in a thesaurus database and checking whether any of the operation names in the thesaurus database matches a request for searching the classified executive element by operation name; and when a match is found, recursively executing another search using the operation name found in the thesaurus database.

11. A computer-readable storage medium storing thereon a program executable by a processor for selecting, for a project including plural tasks, executive elements that indicate activities to carry out a task and thereby supporting organization of the plural executive elements, the program comprising:

a first module for classifying the executive elements into processible tasks in advance and managing the classified executive elements;

a second module for searching the executive elements classified and managed for a candidate executive element that can process a task of a project that includes plural tasks and selecting the candidate executive element from the executive elements classified and managed, the selecting being based on the classification; and a third module for searching operation names representing processible tasks in a thesaurus database and checks whether any of the operation names in the thesaurus database matches a request for searching the classified executive element by operation name and, when a match is found, recursively executing another search using the operation name found in the thesaurus database.

12. The storage medium according to claim 11, wherein the first module calls a program performing the classification and management of the executive elements, and the second module calls a program searching for and selecting the executive element.

13. An element organization support system, comprising:

a database server for classifying data pieces regarding plural executive elements that indicate activities to carry out a task constituting various services into processible tasks, and managing the executive elements, the data pieces regarding executive elements including at least one of human and physical elements;

a reception server for receiving a request for preparation of organization of executive elements for processing a specific service asked by a customer;

an analysis server for analyzing a task required for the specific service as instructed by the customer, and selecting from the database server, on the basis of the result of the analysis, a data piece regarding a candidate executive element for executing the task required for the specific service, the selecting being based on the classification; and a thesaurus database server that:

stores data pieces constituting concepts of operation names representing processible tasks;

searches the operation names in a thesaurus database and checks whether any of the operation names in the thesaurus database matches a recluest for searching the classified executive element by operation name; and when a match is found, recursively executes another search using the operation name found in the thesaurus database.

* * * * *